United States Patent
Diener

(10) Patent No.: US 7,460,837 B2
(45) Date of Patent: Dec. 2, 2008

(54) USER INTERFACE AND TIME-SHIFTED PRESENTATION OF DATA IN A SYSTEM THAT MONITORS ACTIVITY IN A SHARED RADIO FREQUENCY BAND

(75) Inventor: Neil R. Diener, Rockville, MD (US)

(73) Assignee: Cisco Technology, Inc., San Jose, CA (US)

( * ) Notice: Subject to any disclaimer, the term of this patent is extended or adjusted under 35 U.S.C. 154(b) by 553 days.

(21) Appl. No.: 10/953,231

(22) Filed: Sep. 29, 2004

(65) Prior Publication Data

US 2005/0227625 A1    Oct. 13, 2005

Related U.S. Application Data

(60) Provisional application No. 60/556,513, filed on Mar. 25, 2004.

(51) Int. Cl.
  H04B 7/24    (2006.01)
  H04B 17/00    (2006.01)
(52) U.S. Cl. .................. 455/67.7; 455/39; 455/67.11
(58) Field of Classification Search ............. 455/68–69, 455/67.11, 67.12, 67.7; 715/733–736
  See application file for complete search history.

(56) References Cited

U.S. PATENT DOCUMENTS

| | | | |
|---|---|---|---|
| 4,839,582 A | 6/1989 | Fukaya et al. ............. 324/77 B |
| 5,093,927 A | 3/1992 | Shanley ...................... 455/513 |
| 5,142,691 A | 8/1992 | Freeburg .................... 455/63.3 |
| 5,144,642 A | 9/1992 | Weinberg et al. ............. 375/10 |
| 5,276,908 A | 1/1994 | Koohgoli et al. ........... 455/34.1 |
| 5,355,522 A | 10/1994 | Demange ..................... 455/62 |
| 5,428,819 A | 6/1995 | Wang et al. ................. 455/454 |
| 5,574,979 A | 11/1996 | West ......................... 455/63.1 |
| 5,608,727 A | 3/1997 | Perreault et al. ............ 370/462 |
| 5,610,839 A | 3/1997 | Karolak et al. .............. 455/450 |
| 5,636,140 A | 6/1997 | Lee et al. ..................... 370/469 |
| 5,655,217 A | 8/1997 | Lemson ....................... 455/513 |
| 5,696,903 A | 12/1997 | Mahany ................. 395/200.58 |
| 5,732,077 A | 3/1998 | Whitehead .................. 370/349 |
| 5,745,777 A | 4/1998 | English et al. .............. 375/228 |
| 5,809,427 A | 9/1998 | Perreault et al. ............ 455/513 |

(Continued)

*Primary Examiner*—Nay Maung
*Assistant Examiner*—Janelle Young
(74) *Attorney, Agent, or Firm*—Edell, Shapiro & Finnan, LLC

(57) ABSTRACT

An intelligent spectrum management (ISM) system and method that includes sophisticated features to detect, classify, and locate sources of RF activity. The system comprises one or more radio sensor devices positioned at various locations in a region where activity in a shared radio frequency band is occurring. A server is coupled to the radio sensor devices and aggregates the data generated by the sensor devices. Data collected and processed by the server from the sensors may be coupled to a console application that displays the data in desirable user interface format. According to one aspect, the server continuously stores spectrum analysis data pertaining to activity in a frequency band over time and/or protocol analysis data pertaining to analysis of packets transmitted in the frequency band according to a communication protocol. A console application includes a time-shift display mode that permits a user to specify an instant of time prior to the current time from which to playback spectrum analysis data and/or protocol analysis data generated by one or more radio sensor devices.

27 Claims, 12 Drawing Sheets

U.S. PATENT DOCUMENTS

| | | | |
|---|---|---|---|
| 5,850,596 A | 12/1998 | Reynolds | 455/63.1 |
| 5,864,541 A | 1/1999 | Abu-Amara et al. | 370/253 |
| 5,889,772 A | 3/1999 | Fischer et al. | 370/346 |
| 5,907,812 A | 5/1999 | Van De Berg | 455/461 |
| 5,930,733 A | 7/1999 | Park et al. | 702/76 |
| 6,031,833 A | 2/2000 | Fickes et al. | 370/349 |
| 6,084,919 A | 7/2000 | Kleider et al. | 375/285 |
| 6,131,013 A | 10/2000 | Bergstrom et al. | 455/63 |
| 6,141,565 A | 10/2000 | Feuerstein et al. | 455/560 |
| 6,167,237 A | 12/2000 | Rapeli | 455/63 |
| 6,169,728 B1 | 1/2001 | Perreault et al. | 370/235 |
| 6,212,566 B1 | 4/2001 | Vanhoof et al. | 709/230 |
| 6,226,680 B1 | 5/2001 | Boucher et al. | 709/230 |
| 6,229,799 B1 | 5/2001 | Caillerie et al. | 370/347 |
| 6,229,998 B1 | 5/2001 | Hamdy et al. | 455/226.1 |
| 6,256,478 B1 | 7/2001 | Allen | 455/63.1 |
| 6,275,695 B1 | 8/2001 | Obhan | 455/423 |
| 6,295,461 B1 | 9/2001 | Palmer et al. | 455/557 |
| 6,307,839 B1 | 10/2001 | Gerszberg et al. | 370/235 |
| 6,317,599 B1 | 11/2001 | Rappaport et al. | 455/446 |
| 6,327,418 B1 | 12/2001 | Barton | 386/46 |
| 6,332,076 B1 | 12/2001 | Shah et al. | 455/423 |
| 6,349,198 B1 | 2/2002 | Carlson et al. | 455/63.1 |
| 6,351,643 B1 | 2/2002 | Haartsen | 455/450 |
| 6,366,780 B1 | 4/2002 | Obhan | 455/423 |
| 6,374,079 B1 | 4/2002 | Hsu | 455/11.1 |
| 6,374,082 B1 | 4/2002 | Carlson | 455/63.1 |
| 6,385,434 B1 * | 5/2002 | Chuprun et al. | 455/11.1 |
| 6,418,131 B1 | 7/2002 | Snelling et al. | 370/337 |
| 6,442,507 B1 | 8/2002 | Skidmore et al. | 702/186 |
| 6,499,006 B1 | 12/2002 | Rappaport et al. | 703/20 |
| 6,584,175 B1 | 6/2003 | Kibria et al. | 379/1.03 |
| 6,590,587 B1 * | 7/2003 | Wichelman et al. | 715/736 |
| 6,629,151 B1 | 9/2003 | Bahl | 709/250 |
| 6,801,756 B1 * | 10/2004 | Agrawal et al. | 455/67.11 |
| 7,039,017 B2 * | 5/2006 | Sherlock | 370/252 |
| 2001/0008837 A1 | 7/2001 | Takahashi | 455/403 |
| 2002/0006799 A1 | 1/2002 | Rappaport et al. | 455/446 |
| 2002/0019214 A1 | 2/2002 | Brown et al. | 455/67.11 |
| 2002/0077787 A1 | 6/2002 | Rappaport et al. | 702/188 |
| 2002/0085503 A1 | 7/2002 | Hulyalkar et al. | 370/252 |
| 2002/0086641 A1 | 7/2002 | Howard | 455/67.1 |
| 2002/0105911 A1 * | 8/2002 | Pruthi et al. | 370/241 |
| 2002/0111772 A1 | 8/2002 | Skidmore et al. | 702/186 |
| 2002/0142744 A1 | 10/2002 | Okanoue et al. | 455/226.1 |
| 2002/0154614 A1 | 10/2002 | Jagger et al. | 375/332 |
| 2002/0155811 A1 | 10/2002 | Prismantas et al. | 455/226.1 |
| 2002/0177446 A1 | 11/2002 | Bugeja et al. | 455/450 |
| 2003/0021237 A1 | 1/2003 | Min et al. | 370/252 |
| 2003/0050012 A1 | 3/2003 | Black et al. | 455/62 |
| 2003/0050070 A1 | 3/2003 | Mashinsky et al. | 455/452 |
| 2003/0123420 A1 | 7/2003 | Sherlock | 370/338 |
| 2003/0198200 A1 | 10/2003 | Diener et al. | 370/329 |
| 2003/0198304 A1 | 10/2003 | Sugar et al. | 375/340 |
| 2003/0224741 A1 | 12/2003 | Sugar et al. | 455/115.1 |
| 2004/0023674 A1 | 2/2004 | Miller | 455/462 |
| 2004/0028003 A1 | 2/2004 | Diener et al. | 370/319 |
| 2004/0028123 A1 | 2/2004 | Sugar et al. | 375/224 |
| 2004/0137915 A1 | 7/2004 | Diener et al. | 455/456.1 |
| 2006/0221848 A1 * | 10/2006 | Lake | 370/252 |

\* cited by examiner

FIG. 7

| Alert Level | Type | Message | Date & Time | sec | usec | ID | Source ID |
|---|---|---|---|---|---|---|---|
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| | Interferer | MICROWAVE OVEN Turned ON | 14:33:48 03/12/2004 | 46 | 917712 | 3 | 0 |
| | Interferer | GN CORDLESS PHONE Turned ON | 14:33:57 03/12/2004 | | | | 0 |
| Low | Interferer | BLUETOOTH HEADSET Turned OFF | 14:34:02 03/12/2004 | View with New AirData view... | | | 0 |
| Low | Interferer | BLUETOOTH HEADSET Turned OFF | 14:33:02 03/12/2004 | View using Stored AirData configuration... | | | 0 |
| High | Interferer | BLUETOOTH HEADSET Turned ON | 14:33:10 03/12/2004 | View in Open AirData window ▶ | | | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| | Interferer | MICROWAVE OVEN Turned ON | 14:33:48 03/12/2004 | 46 | 917712 | 3 | 0 |
| | Interferer | GN CORDLESS PHONE Turned ON | 14:33:57 03/12/2004 | 50 | 395904 | 5 | 0 |
| Low | Interferer | BLUETOOTH HEADSET Turned OFF | 14:34:02 03/12/2004 | 52 | 329520 | 6 | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| High | Interferer | BLUETOOTH HEADSET Turned ON | 14:33:10 03/12/2004 | 29 | 788560 | 7 | 0 |
| Low | Interferer | BLUETOOTH HEADSET Turned OFF | 14:33:02 03/12/2004 | 26 | 525424 | 6 | 0 |
| High | Interferer | BLUETOOTH HEADSET Turned ON | 14:33:10 03/12/2004 | 29 | 788560 | 7 | 0 |
| | Interferer | MICROWAVE OVEN Turned ON | 14:33:48 03/12/2004 | 46 | 917712 | 3 | 0 |
| | Interferer | GN CORDLESS PHONE Turned ON | 14:33:57 03/12/2004 | 50 | 395904 | 5 | 0 |
| Low | Interferer | BLUETOOTH HEADSET Turned OFF | 14:34:02 03/12/2004 | 52 | 329520 | 6 | 0 |

Event: Interferer Classified  
Message: BLUETOOTH HEADSET TURNED OFF  
Date & Time: 14:33:02  
Severity: Low

Events or Alarms

USER INTERFACE AND TIME-SHIFTED PRESENTATION OF DATA IN A SYSTEM THAT MONITORS ACTIVITY IN A SHARED RADIO FREQUENCY BAND

This application is related to U.S. application Ser. No. 10/717,852, filed Nov. 19, 2003, claims priority to the following U.S. Provisional Patent Applications:

U.S. Application No. 60/556,513, filed Mar. 25, 2004.

The entirety of each of these applications is incorporated herein by reference.

BACKGROUND OF THE INVENTION

The present invention relates to a system and method for monitoring activity in a shared frequency band one or more radio sensor devices positioned to capture data concerning activity in the shared frequency band at various locations.

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is occurring place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) may degrade. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little or no capability to manage the frequency band where signals of multiple types (e.g., communication protocol/network types, device types, etc.) are present.

There are many shortcomings of existing WLAN system technologies. Current WLAN technologies are only generally aware of other network elements. They have no way to discover other nearby sources emitting RF signals in the unlicensed bands. The lack of device discovery and location functions exposes existing WLANs to significant security vulnerabilities. While current WLANs can perform standard authentication services and encryption services, they are vulnerable to imposter stations, denial-of-service attacks, parking lot attacks, and other security breaches.

SUMMARY OF THE INVENTION

Briefly, an intelligent spectrum management (ISM) system and method are provided that includes sophisticated features to detect, classify, and locate sources of RF activity. The system comprises one or more radio sensor devices positioned at various locations in a region where activity in a shared radio frequency band is occurring. A server is coupled to the radio sensor devices and aggregates the data generated by the sensor devices. Each radio sensor device comprises a spectrum monitoring section and a traffic monitoring section. The spectrum monitoring section comprises a radio receiver capable of receiving radio signals in a radio frequency band, a spectrum analysis system coupled to the radio receiver for generating spectrum (radio frequency) activity information representative of the (radio frequency) activity in the frequency band. The traffic monitoring section comprises a baseband signal processing section that demodulates signals transmitted by other devices on a wireless network in the frequency band according to the communication protocol and a radio receiver coupled to the baseband signal processing section that receives signals on the wireless network and couples received signals to the baseband signal processing section. A processor is coupled to the spectrum monitoring section and to the traffic monitoring section. The processor executes one or more programs to analyze packets transmitted by devices on the wireless network in the frequency band based on signals demodulated by the baseband signal processing section and to classify radio signals occurring in the frequency band based on the spectrum activity information output by the spectrum analysis system.

The server receives data from each of the plurality of sensor devices and executes functions to process the data. For example, the server executes a performance function that monitors and generates events related to the performance of the wireless network, a discovery function that monitors and generates events pertaining to devices operating in the wireless network or other radio frequency emitters in the frequency band and a security function that monitors and generates events related to security threats to the wireless network. In addition, the server interfaces data generated by its various functions to a client application, e.g., a network management application.

Data collected and processed by the server from the sensors may be presented to a user by a console application. The server continuously stores spectrum analysis data and/or protocol analysis data pertaining to activity in a frequency band over time. The console application presents the spectrum analysis data and/or protocol analysis data associated with the event. This functionality provides a time-shift display mode to allow a user to display data associated with activity in a frequency band without being present (both in time and location) with respect to occurrence of that activity.

The above and other advantages of this technique will become more apparent when reference is made to the following description taken in conjunction with the accompanying drawings.

BRIEF DESCRIPTION OF THE DRAWINGS

FIG. 7 is an exemplary display of an event log window that shows various events tracked by the server and how additional information about an event may be obtained.

FIG. 10 is an exemplary display for a window that is used to set threshold crossing alarm conditions.

FIG. 11 is an exemplary display for a window that is used to display interferer devices detected by one or more sensors.

DETAILED DESCRIPTION OF THE DRAWINGS

The system, methods, software and other technologies described herein are designed to cooperatively manage use of a shared frequency band where signals of multiple types occur (often simultaneously), such as an unlicensed band, and interference among the users of the band may occur. Many of the concepts described herein may apply to frequency bands that are not necessarily "unlicensed," such as when a licensed frequency band is used for secondary licensed or unlicensed purposes.

The term "network" is used hereinafter in many ways. There may be one or more wireless networks each comprising multiple devices or nodes that operate in the shared frequency band. One example of such a network is an IEEE 802.11 WLAN. There are also networks, called piconets, which are formed with Bluetooth™ capable devices. Many of the examples described herein are made with respect to an IEEE 802.11 (also known as WiFi™) WLAN, mostly due in part to the expansive use that the WLAN has seen, and is expected to continue to see. In addition, the term network may refer to a wired network, and to an aggregation of one or more wired and wireless networks. The spectrum management and monitoring systems, methods, software and device features described herein are not limited to any particular wireless network, and are equally applicable to any wireless network technologies now known or hereinafter developed for a frequency band where it is desired to monitor activity occurring that may affect operation of wireless radio communications. For example, the system and methods described herein are applicable to monitoring activity in wide area network wireless communications.

The Environment

Figure 1:
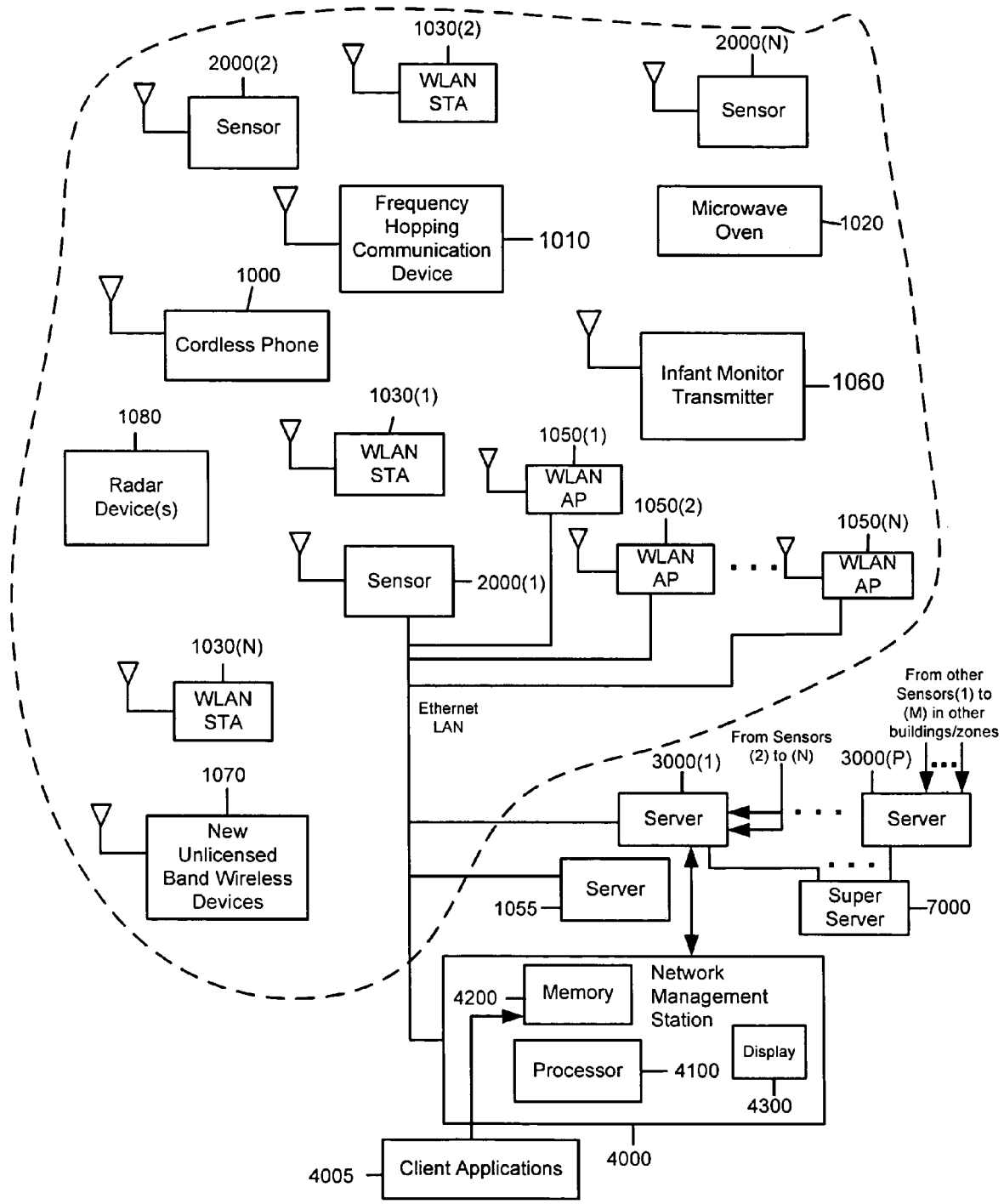
FIG. 1 is a block diagram of a spectrum management sensor system.
Figure 2:
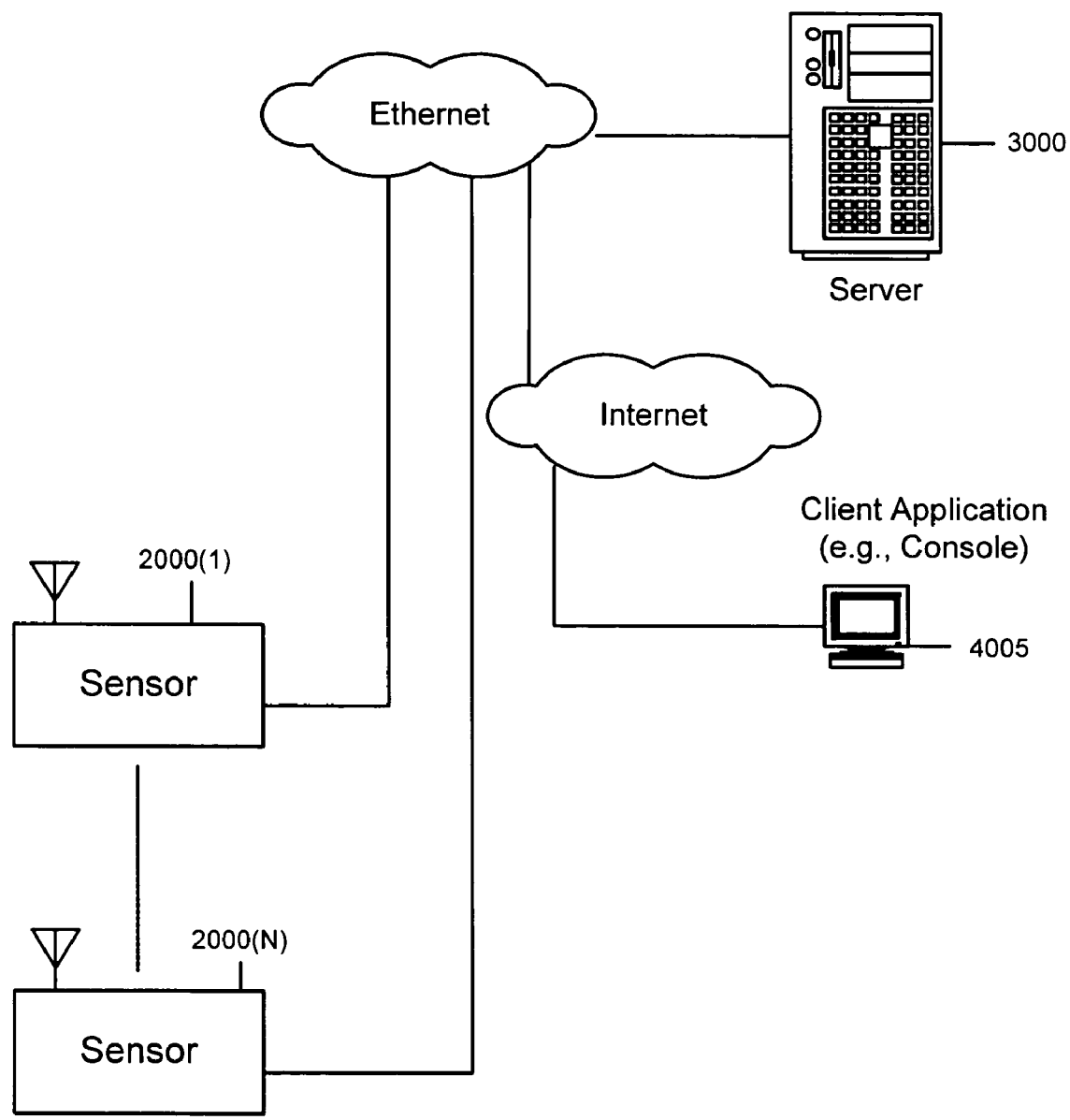
FIG. 2 is a block diagram of a sensor-server system.

Referring first to FIGS. 1 and 2, an environment is shown where there are multiple devices that at some point in their modes of operation transmit or emit signals within a common frequency band, and that may at least partially overlap in frequency and time. When these devices are sufficiently close in proximity to each other, or transmit signals at sufficiently high power levels, there will inevitably be interference between signals of one or more devices. The dotted-line shown in FIG. 1 is meant to indicate a region where activity from any of the devices shown may impact other devices. A region may be a building in which there are multiple zones of unlicensed band activity. FIG. 1 shows a non-exhaustive exemplary selection of devices that may operate in an unlicensed frequency band, including cordless phones 1000, frequency hopping communication devices 1010, microwave ovens 1020, a wireless local area network (WLAN) comprised of a WLAN access point 1050(1) and its associated client station (STAs) 1030(1), 1030(2) to 1030(N), infant monitor devices 1060 as well as any other existing or new wireless devices 1070. Multiple WLAN APs 1050(1) to 1050(N) may be operating in the region, each of which has one or more associated client STAs 1030(1) to 1030(N).

One or more of the WLAN APs 1050(1) to 1050(N) may be connected to a wired network (e.g., Ethernet network) to which also connected is a server 1055. Cordless phones 1000 may be analog, digital and frequency hopping devices, depending on the type. Frequency hopping communication devices 1010 may include devices operating in accordance with the Bluetooth™ wireless communication protocol, the HomeRF™ wireless communication protocol, as well as cordless phones. In addition, radar devices 1080 may operate in an unlicensed frequency band. Other devices that may operate in the frequency band may also include appliances such as digital (still and/or) video cameras, cable-set top boxes, etc.

The spectrum management system described herein involves deployment of a plurality of sensors 2000(1) to 2000(N) shown in FIG. 1 in various locations or zones where activity associated with any of the plurality of signal types is occurring in the frequency band to form a sensor overlay network. The spectrum and protocol intelligence gathered by the sensors is fed to a server 3000. There may be multiple servers 3000(1) to 3000(P) each coupled to a plurality of sensors. A super server 7000 may connect to the plurality of servers 3000(1) to 3000(P) to manage each of the servers. There may be one server for each building or portion of a building, and the super server 7000 may manage the servers across a campus of buildings. For simplicity, a single server 3000 (corresponding to server 3000(1)) will be referred to in the following description. The server 3000 contains the aggregation and analysis software which processes low-level spectrum and protocol analysis data from the sensors 2000(1) to 2000(N) and provides network level services described hereinafter. The sensors 2000(1) to 2000(N) are referred to as "agents" to the server 3000. A network management station 4000 executes one or more end-user client management applications 4005 or contains network management server software that requests services from the server. The network management station 4000 may include one or more processors 4100, memory 4200 and a display 4300. An example of an end-user management application is a graphical user interface (GUI) console application for use by network engineers or IT managers. Some of the functions which may be performed by a network management server include WLAN management functions, such as (1) AP configuration, AP firmware upgrades, etc.; (2) security management such as authentication or virtual private network (VPN) management; and (3) management of other networks, such as a wired Ethernet network. The network management station 4000 is referred to as a "client" to the server 3000. The network management station 4000 may be part of a larger WLAN management infrastructure including servers and switches, which in turn, interfaces with a generalized (wired and wireless) network management infrastructure.

Figure 3:
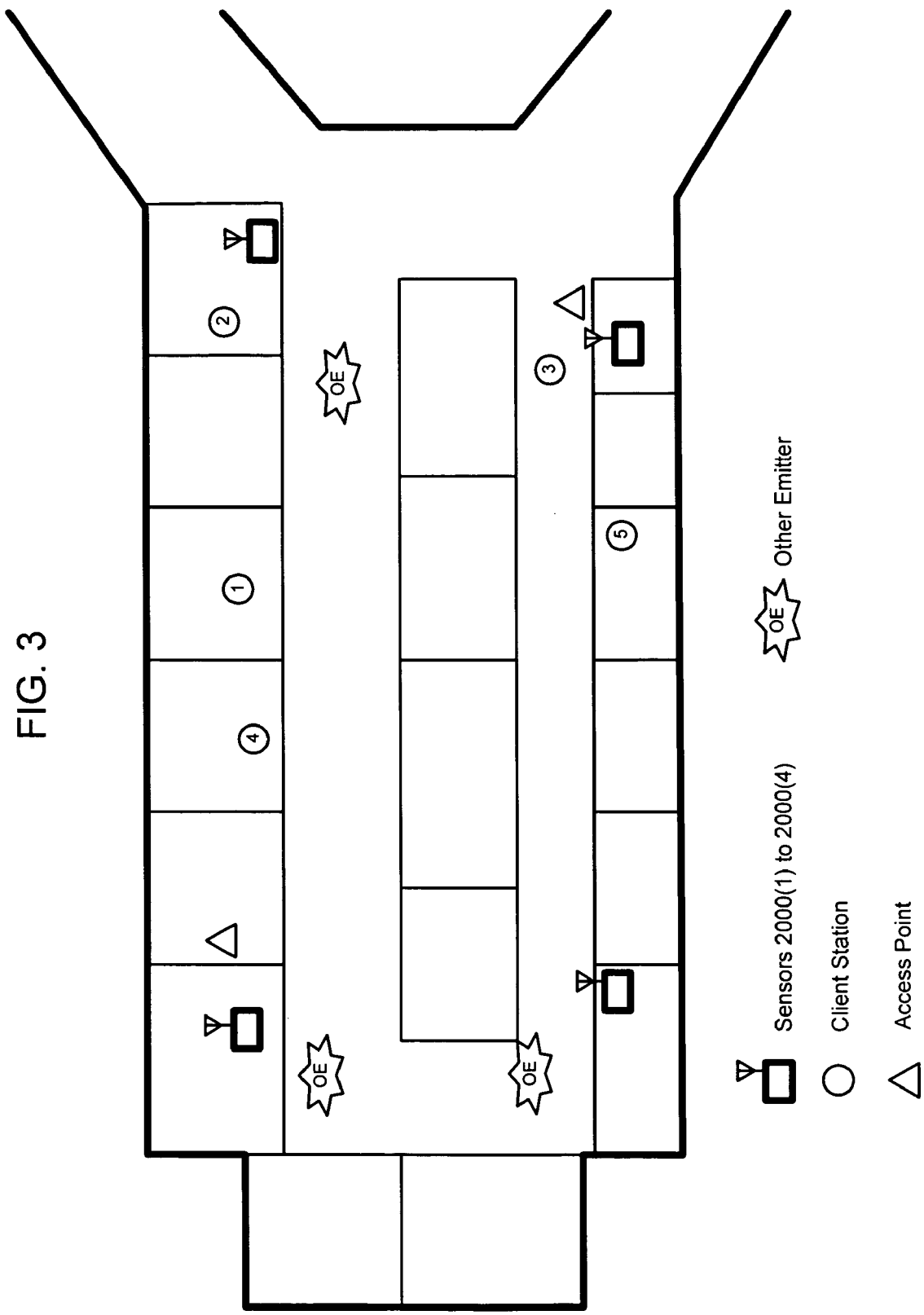
FIG. 3 is a map diagram depicting an environment where a WLAN exists together with other non-WLAN activity.

FIG. 3 shows the example of an office space in a building where the sensors 2000(1) to 2000(N) may be deployed to monitor activity that is occurring in the presence of a WLAN consisting of APs and client stations at various locations as shown. The other emitters (OEs) may be, for example, any one or more of the non-WLAN emitters referred to above in conjunction with FIG. 1. The sensors will receive radio frequency energy in their proximity and produce spectrum and/or protocol analysis data representing the activity they detect. This information is coupled to the server for various processing.

The Sensor

Figure 4:
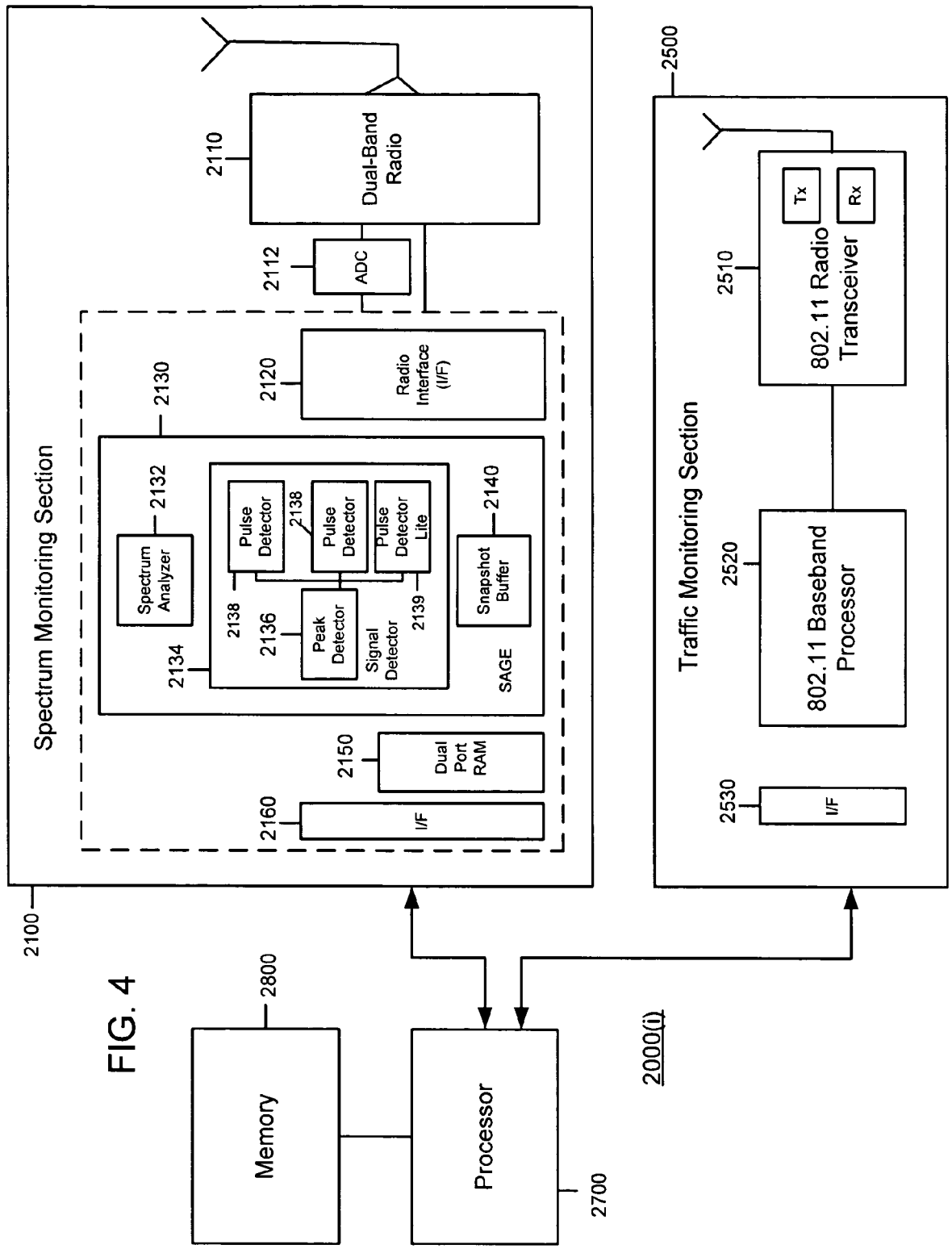
FIG. 4 is a block diagram of a sensor.

Turning now to FIG. 4, each sensor 2000(i) comprises a spectrum monitoring 2100 section to monitor RF activity in the frequency band and a traffic monitoring section 2500 that is capable of sending and receiving traffic according to a communication protocol, such as an IEEE 802.11 WLAN protocol. The spectrum monitoring section 2100 comprises a radio 2110 (primarily for receive operations) that is capable of tuning to receive energy at each channel (or simultaneously all channels in a wideband mode) of, for example, any of the unlicensed bands (2.4 GHz and 5 GHz) in which IEEE 802.11 WLANs operate. An analog-to-digital converter (ADC) 2112 is coupled to the radio 2100 that converts the downconverted signals from the radio 2100 to digital signals. A radio interface (I/F) 2120 is coupled directly to the radio 2100 and also to the output of the ADC 2112. A real-time spectrum analysis engine (SAGE) 2130 is coupled to the radio I/F 2120. The SAGE 2130 includes a spectrum analyzer 2132, a signal detector 2134 consisting of a peak detector 2136 and one or more pulse detectors 2138 and 2139, and a snapshot buffer 2140. A Fast Fourier Transform (FFT) block (not shown) is coupled between the I/F 2120 and the spectrum analyzer 2132, or included in the spectrum analyzer 2132. The SAGE 2130 generates spectrum activity information that is used in the sensor and/or the server to determine the types of signals occurring in the frequency band, and captures signals for location measurement operations. A dual port random access memory (RAM) 2150 is coupled to receive the output of the SAGE 2130 and a processor I/F 2160 interfaces data output by the SAGE 2130 to a processor 2700, and couples configuration information from the processor 2700 to the SAGE 2130.

The functions of the SAGE 2130 will be briefly described in further detail hereinafter, but more details on the SAGE can be found in commonly assigned U.S. Pat. No. 6,714,605, commonly assigned co-pending U.S. application Ser. No. 10/420,511, filed Apr. 22, 2003, entitled "System and Method for Real-Time Spectrum Analysis in a Radio Device," and commonly assigned co-pending U.S. Provisional Patent Application No. 60/587,834, filed Jul. 14, 2004, entitled "Pulse Detection Scheme for Use in Real-Time Spectrum Analysis." The spectrum analyzer 2132 generates data representing a real-time spectrogram of a bandwidth of radio frequency (RF) spectrum, such as, for example, up to 100 MHz. The spectrum analyzer 2132 may be used to monitor all activity in a frequency band, for example, the 2.4-2.483 GHz ISM band, or the 5.15-5.35 GHz and 5.725-5.825 GHz UNII bands. The FFT block referred to above is, for example, a 256 frequency bin FFT block that provides (I and Q) FFT data for each of 256 frequency bins that span the bandwidth of the frequency band of interest. An FFT block with greater resolution or bandwidth may be used as well. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 2132 may further comprise a power computation block that computes (FFTdataI)2 and (FFTdataQ)2, respectively, and adds them together, to output a power value for each FFT frequency bin. The spectrum analyzer 2132 may further include a stats logic block that has logic to accumulate statistics for average power, duty cycle, maximum power and a peaks histogram. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 2150 for 10,000 FFT intervals before the processor reads out the values. The power versus frequency data generated by the spectrum analyzer 2132 is also used as input to the signal detector.

The signal detector 2134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 2134, the peak detector 2136 looks for spectral peaks in the (power versus frequency data derived from FFT block output), and reports the bandwidth, center frequency and power for each detected peak. The output of the peak detector 2136 is one or more peaks and related information. The pulse detectors 2138 detect and characterize signal pulses based on input from the peak detector 2136. A pulse detector lite 2139 may be employed to generate pulse events in a manner slightly different from pulse detectors 2138, as described in the aforementioned co-pending application entitled "Pulse Detection Scheme for Use in Real-Time Spectrum Analysis" filed on Jul. 14, 2004.

The snapshot buffer 2140 collects a set of raw digital signal samples useful for signal classification and other purposes, such as location measurements. The snapshot buffer 2140 can be triggered to begin sample collection from either the signal detector 2134 or from an external trigger source, such as a signal from the processor, to capture received signal data for a period of time sufficient to include a series of signal exchanges. Alternatively, the snapshot buffer will be in a free-running state continuously storing captured and then in response to detecting the first signal (e.g., the Probe Request frame), the snapshot buffer is put into a post-store mode that extends long enough to capture the ACK frame signal data.

The traffic monitoring section 2500 monitors packet activity in a wireless network, e.g., a WLAN, and sends and receives certain packets that may be used for location measurement processes. For example, as described hereinafter, a sensor may transmit an 802.11 Probe Request frame, data frame or request-to-send frame that may be addressed to the device to be located. Included in the traffic monitoring section 2500 are a radio transceiver 2510 (comprising a transmitter Tx and a receiver Rx) and a baseband signal processor 2520. The radio transceiver 2510 and baseband signal processor 2520 may be part of a package chipset available on the market today, such as an 802.11 WLAN chipset for any one or more of the 802.11a/b/g or other WLAN communication standards. The baseband signal processor 2520 is capable of performing the baseband modulation, demodulation and other PHY layer functions compliant with the one or more communication standards of interest (e.g., IEEE 802.11a, b, g, h, etc.). An I/F 2530 couples the baseband signal processor 2520 and radio transceiver 2510 to the processor 2700.

There may be other traffic monitoring sections in the sensor to monitor communication protocol type activity of other types, such as Bluetooth™ communications.

The processor 2700 performs the various processing algorithms described herein on the output of the SAGE 2130 and on received packets from the traffic monitoring section 2500. The processor I/F 2160 of the spectrum monitoring section 2100 and the processor I/F 2530 of traffic monitoring section 2500 may be a Mini-PCI or PC-Card (e.g., Cardbus™) interface, or any other interface known in the art. While not shown in FIG. 4, there is also an LAN interface block (e.g., Ethernet) that is coupled to the processor 2700 to enable the sensor to communicate with the server with a wired LAN connection. The processor 2700 may generate signals to control the radio 2110 independently of the radio transceiver 2510, such that spectrum monitoring is occurring on one channel while protocol monitoring is simultaneously occurring on another channel, for example. The sensor may also communicate with the server via a WLAN connection.

It is envisioned that a WLAN AP may include all of the functionality of a sensor described above, and may be switched between AP operating mode and a sensor operating mode.

Figure 5:
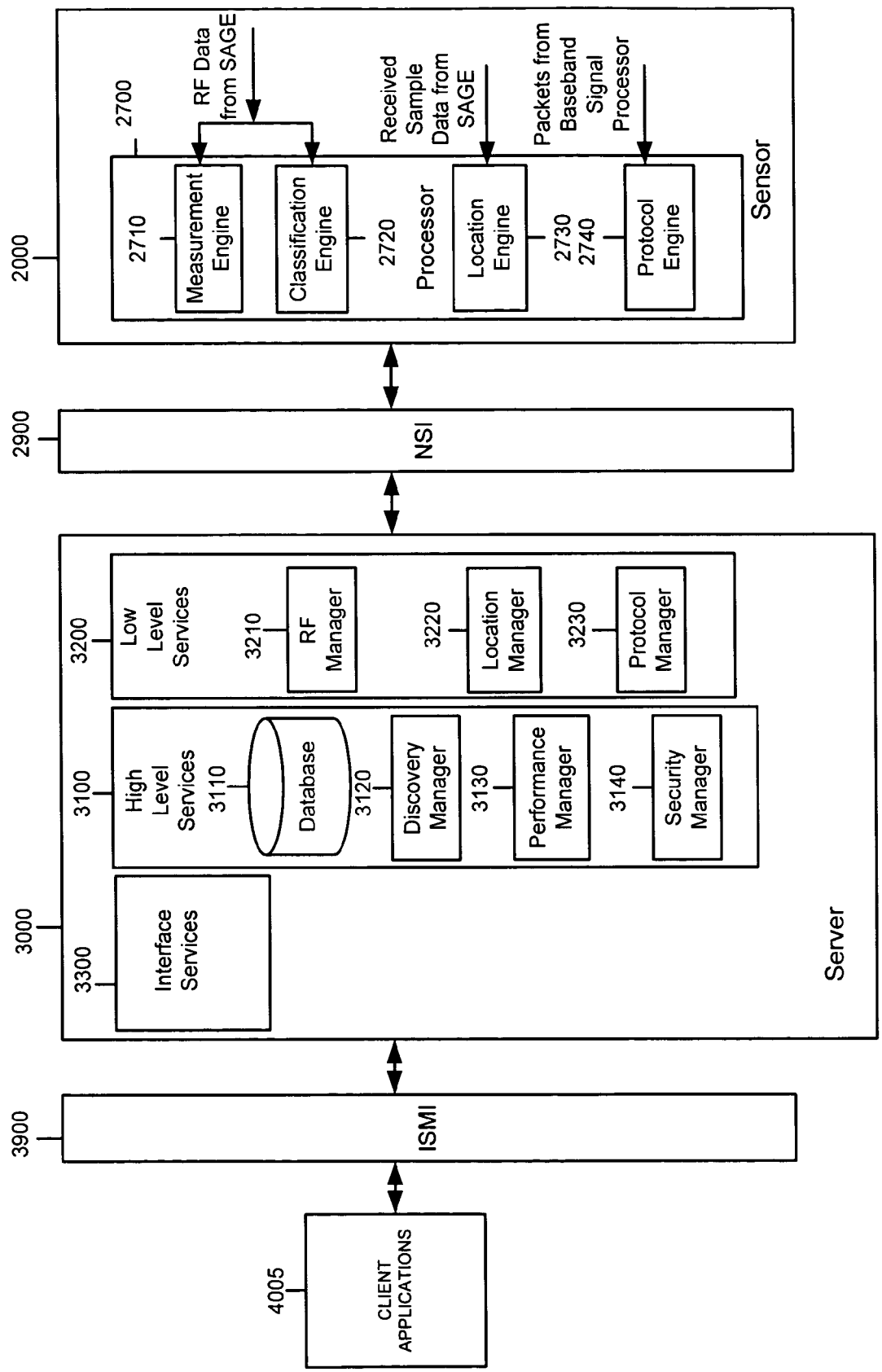
FIG. 5 is a block diagram of major functional blocks in the sensor and server.

FIG. 5 is a high level diagram that shows the major functional blocks in the sensor 2000 and server 3000, as well as the interfaces between the sensor 2000 and server 3000, and between client applications 4005 and the server 3000. In the sensor 2000, there are functions performed by the processor (executing one or more software programs) including a measurement engine 2710, a classification engine 2720, a location engine 2730 and a protocol engine 2740. The measurement engine 2710 and classification engine 2720 operate on RF data from the SAGE 2130. The location engine 2730 operates on raw received signal data obtained by the SAGE 2130 and the protocol engine 2740 operates on WLAN packet data generated by the baseband signal processor 2520.

The interface between the sensor 2000 and the server 3000 is referred to as a network spectrum interface (NSI) 2900.

The server 3000 may run on a dedicated server box, or it may be integrated with other servers such as WLAN switches, authentication servers or management servers. There are high level services 3100, low level services 3200, and interface services 3300. The high level services 3100 include a database 3110, discovery manager 3120, performance manager 3130 and security manager 3140. The low level services 3200 are invoked by one or more or the high level services 3100 and include an RF manager 3210, location manager 3220 and protocol manager 3230. The interface services 3300 manages interfaces between the server 3000 and client applications 4005 by an application programming interface (API) called the intelligent spectrum management interface (ISMI) 3900.

The functions provided by the server 3000 can be summarized as follows. The server manages all of the sensors it communicates with. It aggregates data from the sensors, performs analysis on the data and presents the data in formats amenable to other network management entities.

The software functions of the sensor 2000 will be described in more detail.

The measurement engine 2710 software in the sensor is responsible for communicating with the SAGE driver software to configure the SAGE 2130 in the sensor 2000. In addition, the measurement engine 2710 manages the resources of the SAGE 2130 between spectrum monitoring functions and device location functions. The measurement engine 2710 also collects and aggregates data from the SAGE 2130 into meaningful units. The functions of the measurement engine 2710 and classification engine 2720 may be incorporated into a single functional block. Furthermore, the measurement engine 2710 may configure reporting of data and statistics generated by the SAGE 2130 and adjust the frequency channel (and/or scan rate) on which the SAGE 2130 operates. The measurement engine 2710 may also operate the radio receiver in the sensor in a wideband mode to simultaneously process data across an entire unlicensed frequency band of interest. The measurement engine 2710 produces the spectrum activity data from raw spectrum analysis and snapshot buffer data output by the SAGE 2130. The spectrum activity data, simply put, comprises data representing one or more of time, frequency and power of radio frequency energy received in a portion (or all) of a frequency band.

One function of the measurement engine 2710 is to control which bands are monitored, and to produce streams from spectrum analyzer statistics (SA STAT) and pulses produced by the SAGE. A SA STAT stream consists of one or more of: maximum power, average power, and average duty cycle for a particular frequency range or channel, over relatively short periods of time.

A pulse stream reports on individual pulses that have been detected by the sensor.

A pulse histogram stream provides histogram data on attributes of pulses of energy detected by the sensor, including histograms for center frequency, bandwidth, duration, inter-pulse (gap, e.g., start to start), and power.

In addition, the measurement engine 2710 produces air quality (AQ) metrics that measure different attributes of a given "channel". The channels can be any requested range of frequencies, and might include an entire band if so desired. There are also protocol related AQ metrics derived by the server from the protocol monitoring records produced by the protocol engine in a sensor.

Although many of the previously described measurements can be decimated over longer time intervals to reduce network bandwidth, the AQ metrics are intended for longer statistical measures and would normally be enabled for intervals in the range of once a minute, as an example. The time interval over which an air quality metric is computed is referred to as an AQ update interval.

The following is the exemplary list of spectrum AQ metrics.

Maximum Power: Derived from the SA STATs, this may be the maximum power measurement in any bin for the specified frequency range or channel of interest. Alternatively, it may be the maximum power in a defined channel or frequency range over multiple FFT cycles that span a given time interval.

Average Power: Derived from the SA STATs, this is the average of average power measurement across all bins for the specified frequency range or channel of interest. Average power may be the logarithmic average power derived from the SA STATS, or it may be an RMS average power in a channel or frequency range derived from SA STATS or from computations performed on data captured by the snapshot buffer in the SAgE.

Duty Cycle: For all pulses that overlap the channel, it is the measure of the time that 1 or more pulses are present divided by the time spent monitoring the specified frequency range or channel of interest (normalized for overlap of dwell with frequency range or channel). A configurable IFS setting can be used to approximate impact on CSMA-CA protocols, such as 802.11. This extends the pulse durations for a configured additional back off time, before treating the channel as inactive.

Pulses Per Second: For all pulses that overlap the specified frequency range or channel of interest, this is the total number of pulses divided by the time spent monitoring this channel or frequency range (normalized for overlap of dwell with the channel or frequency range).

Average Pulse Duration: For all pulses that overlap the specified frequency range or channel of interest, this is the average of the pulse durations.

An AQ stream request can specify up to 32 frequency ranges to take measurements over, an IFS value (described for duty cycle), and a bitmap of requested metrics.

To summarize, each sensor's AQ measurements will consist of the following statistics for each configured frequency range (over a period of time longer than that provided by the SA STATs):
SAGE-based:
Power measurements (max, average)
Duty cycle
Pulses per second
Average pulse duration
Protocol Analysis Based:
Percentage of 802.11 retries (packet resends)
Average 802.11 data rate selection (simply referred to as Average Data Rate). This may be an average data rate derived from the data rate that a sensor observes WLAN traffic to be moving from the sensor's monitoring of over the air WLAN packets. For example, if in a particular AQ update interval (e.g., 20 seconds) three client STAs were detected accessing the WLAN at 54 Mbps for a total of 30 ms and two client STAs accessing the WLAN at 6 Mbps for a total of 20 ms, then the average data rate selection would be (54*30 ms+6*20 ms)/50 ms=34.8 Mbps.
Number of 802.11 Client Stations (STAs) Detected Sensors will send a continual background air quality statistic stream to the server to be continuously stored in the database. In the case of the protocol portion of the air quality statistics, the server computes the noted statistics from the packet analysis data produced by the protocol engine 2740 in the sensor. The use and analysis of the air quality data is described further hereinafter. A user may configure the frequency band of interest and air quality metrics to be streamed to the server for continuous storage (and ultimate display).

The classification engine 2720 classifies/identifies signals occurring in the frequency based on the output of the SAGE 2130. Examples of signals that the classification engine 2720 may identify include Bluetooth™ signals, microwave oven signals, cordless telephones, wireless headsets, radar, etc., signals that would interference with operation of a WLAN. Techniques for signal classification are described in greater detail in U.S. patent application Ser. No. 10/246,364, filed Sep. 18, 2002, entitled "System and Method for Signal Classification of Signals in a Frequency Band"; U.S. patent application Ser. No. 10/420,362, filed Apr. 22, 2003, entitled "System and Method for Classifying Signals Occurring in a Frequency Band"; and U.S. patent application Ser. No. 10/628,603, filed Jul. 28, 2003, entitled "System and Method for Classifying Signals Using Timing Templates, Power Templates and Other Techniques." The classification engine 2720 may generate events (at a configurable update rate) associated with identified signals and may further make a generalized air quality analysis of the frequency band given the type of signals determined to be occurring in the frequency band.

There are several types of classification events that indicate why a message has been sent. These types include the following.

Up: A device has been detected, and has met some minimal confidence level. The measurements include all pulses received until the record is generated.

Down: A device is no longer detectable. This may result because the device has stopped transmitting, its transmissions are below the sensor's detection sensitivity, the template has been unloaded, or monitoring of the band has been cancelled. The measurements include all pulses since the last event record for this instance, and under some cases there may have been no pulses since the last record.

Periodic Update: Since an instance may persist for an extended period of time and the measurements may vary over that interval, the SMC can be directed to produce periodic measurement records. The measurements include all pulses since the last event record for this instance.

The following fields may be present in a classification event record.

Timestamp: This provides a reference timestamp for the classification event.

Instance ID: This is a unique ID assigned to each new instance as it is classified. It can be used to match Update and Down events with the matching Up event.

Template ID: This identifies the template used to classify the device. This implies the name, version, and framework ID to the server.

Event Type: This is one of the event types, listed above.

Confidence Level: This is a number from 0 to 100, used to indicate confidence of the classification.

Average Power: This is the average energy measured across all pulses measured in this record.

Examples of the statistics and events output by the measurement engine 2710 and classification engine 2720 are described hereinafter.

The location engine 2730 in the sensor is responsible for capturing received signal data that is used to compute the location of devices operating in a space in which the sensors are positioned. Many location or position techniques are known in the art, such as time of arrival (TOA), time difference of arrival (TDOA), power of arrival (POA) or received signal strength (RSS). The location engine 2730 makes measurements on received signals (from the device to be located and perhaps from another sensor device) and sends those computations to the server 3000 where the location computation is made. For example, the location engine 2730 may be employed to process data based on received signals from 802.11 devices (clients or APs) in order to locate their positions, as well as other non-802.11 devices operating in the relevant frequency band(s) and which would potentially interfere with 802.11 communication protocol activity. In so doing, the location engine 2730 negotiates access to the snapshot buffer of the SAGE (to capture raw received signal data) by sending a request to the measurement engine 2710. The protocol engine 2740 captures data pertaining to packets transmitted over the air in accordance with a communication protocol, such as the IEEE 802.11 WLAN protocols. This data is referred to as protocol analysis data, and is useful to indicate the performance of communication occurring according to the communication protocol The baseband signal processor section of the sensor 2000 may operate in a "promiscuous mode" by which it can receive packets sent by any device on a particular 802.11 channel (but may not have access to the content of packets). In this manner, the sensor can develop statistics about the type of packets being sent, the volume of packet traffic, packet retransmissions, intruding APs or STAs, etc. Upon receiving a packet, the protocol engine 2740 collects statistics on the packet on a per channel, per device or per BSSID basis. Then, it applies a configurable (user-defined) filter to the packet for purposes of generating statistics. If the filter passes the packet, it is sent to the server for further processing, otherwise it is bit bucketed. For example, the filter may be configurable with a Boolean expression of packet characteristics. Examples of the statistics and events output by the protocol engine 2740 are described hereinafter. The protocol engine 2740 is responsive to a service configuration (Config) message from the server to configure how to capture and report protocol information. In addition, the protocol engine 2740 performs functions to support location determination of other devices, such as scheduling the transmission of a reference packet that is used in TDOA location computations.

The protocol engine 2740 configures the process by which the sensor scans 802.11 channels to obtain packet information. The channel scan parameters may include channel selection, dwell time on the channel, hop pattern between channels, measurement intervals, etc.

Finally, the protocol engine 2740 configures criteria for protocol-based asynchronous alerts associated with network performance or security, or sensor operational conditions according to corresponding threshold based alarm criteria. Examples of techniques useful for protocol-based intrusion detection and address spoofing are described in the paper entitled "Layer 2 Analysis of WLAN Discovery Applications for Intrusion Detection," Joshua Wright, Nov. 18, 2002, and in the paper entitled "Detecting Wireless LAN MAC Address Spoofing," Joshua Wright, Jan. 21, 2003.

The capabilities of the sensor 2000 shown in FIGS. 4 and 5 may be incorporated into a client device, such as an 802.11 WLAN client device that may be a mobile device in the sense that it may move about a space. For example, the client device may be a laptop computer, wireless voice-over-IP phone, etc. The term "client" is to denote a device that is a "client" with respect to a WLAN AP. Other terms for this type of device may be a remote device (unit or station) or mobile device, whereas an AP may also be called a base device, unit or station. In this case, the traffic monitoring section 2500 would handle all 802.11 communications, and the spectrum monitoring section 2100 would handle the real-time spectrum analysis, together with the processor 2700 which would handle the software functions described above for measurement, classification, location, etc. Alternatively, the spectrum monitoring section 2100 and traffic section 2500 may share the same radio. A client station so equipped can generate spectrum measurement data (signal classification, pulse events, pulse histograms, stream spectrum analysis statistics, and air quality statistics) based on the RF environment it experiences as it moves about.

The Server Software

Again, with reference to FIG. 3, the high level services 3100 of the server 3000 will now be described.

The database 3110 provides physical storage of spectrum information, events, protocol information and related information generated by the sensors. In addition, the database 3110 maintains configuration information pertaining to the functions in the server 3000 and many functions in the sensors.

Discovery

The discovery manager 3120 in the server processes data pertaining to the discovery of new devices operating in the frequency band, such as 802.11 and other devices, and the physical location of those devices. Discovery involves handling reports from sensors concerning the up (and new) and down state of such devices. Also, multiple sensors may see the same 802.11 device coming up. The discovery manager 3120 detects and suppresses the duplicate event. A discovery event associated with an 802.11 device may fall into one of the following classes: ours, known others, new and rogue. To this end, the discovery manager 3120 may maintain a list of authorized APs and STAs so that when a new device is detected by a sensor, the discovery manager 3120 can determine whether or not it is authorized. Alternatively, the security manager, described hereinafter, could be the software process that maintains the list of authorized devices and determines the status of newly discovered devices.

Similarly, the discovery manager 3120 also processes data pertaining to known and unknown interferers and handles associated events including up, down, new, and duplicate suppression. The sensors report on new known and unknown interferer devices. Also, multiple sensors may see the same known and unknown interferer device coming up and the discovery manager suppresses the duplicate event.

The discovery manager 3120 executes a scan policy. When a new device is discovered and is in the management domain of the server, a request is made to the location manager 3220 to determine the location of the device.

Finally, the discovery manager 3120 handles event-action association. Given an event (e.g., when a new AP comes up), the discovery manager 3120 initiates one or a series of actions (i.e., check whether the server should manage that device, and if so, locate it, etc.).

Performance

The performance manager 3130 manages performance issues concerning the operation of wireless networks under the domain of the server in the shared frequency band. One such function is based on the air quality analysis by which the performance manager 3130 may indicate to the user overall network and spectrum air quality.

The performance manager 3130 may include a threshold crossing alarm (TCA) manager that manages performance issues concerning the operation of wireless networks under the domain of the server in the shared frequency band. TCAs are user-definable warnings that indicate when RF and/or 802.11 protocol activity have reached levels that may negatively impact performance of a WLAN in the shared frequency band. One such function is to process the air quality data from the sensors. The TCA manager sets a variety of thresholds which, if crossed, generates alarms, called threshold crossing alarms. For example, an alarm may be generated if an AP has too many associated STAs, etc. A user can configure the server to generate an event when certain statistics cross a user-defined threshold level. Each TCA may have two numbers associated with it: a high threshold and a low threshold. The alarm is generated when the value first goes above the high threshold value. The alarm is cleared when the value goes below the low threshold value. The use of two levels helps to prevent oscillation of the alarm condition.

TCAs may be provided for the following Air Quality metrics:

Power measurements (max, average)

Duty cycle

Pulses per second

Average pulse duration

% 802.11 Retries
Average 802.11 Data Rate Selection
802.11 Stations

In addition, TCAs may involve logical combinations of conditions from the above statistics. For example, a TCA could be set on Duty Cycle>X AND Pulses>Y. In addition, a user can specify a list of sensors to which the TCAs apply.

Likewise, a user can configure the system to generate spectrum alert events when (1) a pulse event occurs at a user-specified bandwidth, duration, power and/or center frequency, or (2) a user defined spectral mask is exceeded. The spectrum alert may be triggered up to 20 times, and then will require retriggering by the user (to prevent any accidental flooding of events). Several independent spectrum alerts may be specified.

By combining spectrum and protocol analysis data, along with signal classification data from the sensors and TCAs (calculated internally by the server), the system can provide a continuous, real-time log of all RF events affecting the network. Alerts generated by the server may identify new RF devices in the WLAN environment, including both network (802.11) and non-network devices (typically interferers, such as cordless headphones, microwave ovens, etc.). Alerts may also be generated when devices are down (i.e., no longer connected to the network, or no longer impacting the network). Alerts can be sent by e-mail (to alert off-site network administrators) when mission critical RF events are detected. Alerts can also generate SNMP traps.

Security

The security manager 3140 in the server is responsible for managing security of one or more wireless networks operating in the frequency band under its domain. One type of security function is rogue AP detection. In rogue AP detection, a user can specify which APs are inside a security perimeter of the server and are authorized to operate in that security perimeter based on IP or MAC address. Sensors report the APs and STAs that they detect. The security manager 3140 processes these reports and determines whether an AP that is not authorized to operate inside the security perimeter has been detected. If so, then the security manager 3140 generates an alarm indicating the presence of a rogue AP. A sensor detects the presence of an AP. The security manager 3140 has the responsibility to declare that the detected AP is a rogue.

A client application (user) can specify the parameters of the security perimeter. The security manager 3140 configures the security perimeter accordingly, which may be a polygon or volume region specified by the user. Inside this perimeter are the devices that the user wants to protect. The security manager 3140 may generate an alert when a device physically located outside the security perimeter accesses a WLAN that is located inside the security perimeter. Conversely, the security manager 3140 may generate an alert when a device physically located inside the security perimeter accesses or sends data to a device outside the security perimeter or associates with an AP outside the security perimeter. Moreover, a client user can give a particular device operating within the domain of the server a "fixed location attribute." The security manager 3140 detects whenever that "fixed location" device moves and reports it or generates an alert.

The security manager 3140 may also use trend information to detect "suspicious" protocol usage. A sequence of packets that meets certain filter characteristics might be deemed to be suspicious. For example, suspicious activity may be alerted when a sensor detects repeated attempts to associate with an AP using different MAC addresses. Alternatively, something more subtle that may be deemed suspicious is if a sensor detects packets from a particular STA that have non-sequential sequence numbers, potentially suggesting that a device user is masquerading as a particular STA. Another example is a probe packet that matches a signature of a well-known piece of hacker software such as NetStumbler. These types of activities need to be monitored at the sensor, since it requires examination of detailed packet traces. The security manager 3140 responds to suspicious protocol activity reports sent by sensors.

The low level services 3200 will now be described in more detail.

RF

The RF manager 3210 is responsible for aggregating and logging signal classification events from the classification engine 2720 in a sensor 2000, and for aggregating and logging spectrum statistics and air quality data from the measurement engine 2710. The RF manager 3210 may also supply new or update existing classification templates or reference files to each sensor that the classification engine uses to classify RF signals.

Location

The location manager 3220 in the server handles the location processing to determine a location of a device operating in the frequency band. Location of a device (WLAN or interferer) can be a driving point for other analysis, particularly, security analysis. The location manager 3220 selects a group of sensors (e.g., 4 sensors) for a location measurement operation to locate a particular device. Each location operation usually needs several sensors working in concert. The location manager 3220 selects the subset sensors to be used in a location operation. An example of a location process using time difference of arrival techniques is disclosed in commonly assigned and U.S. application Ser. No. 10/409,563, filed Apr. 8, 2003 referred to above. An example of a RSS location process is described in commonly assigned and U.S. Provisional Application No. 60/582,317, filed Jun. 23, 2004, entitled "System and Method for Locating Radio Emitters Using Self-Calibrated Interpolated Path Loss Computation." The entirety of these prior applications is incorporated herein by reference. Many other TOA, TDOA, RSS and other location techniques are known in the art. The location manager 3220 dispatches location request messages to each of the sensors that are to be part of the location operation. Each sensor generates TDOA or RSS information with respect to their respective receipt of the signals from the target device to be located and sends this information in a message to the location manager 3220. The location manager 3220 performs the final calculations from the TDOA or RSS information to compute the location of the device that is the subject of the location request. The location manager 3220 may have a configurable retry policy for a failed location operation.

Protocol

The protocol manager 3230 in the server is responsible for logging the captured packets by the various sensors into a log file for later processing. There may be a time sync difference between sensors. Different sensors come up (power up) at different times and do not have a concrete time of day concept. They have a notion of ticks with respect to which the server software needs to normalize. For example, sensor 1's tick 30 may represent the same instance of time as sensor 2's tick number 1000. The protocol manager software accounts for such skews.

The protocol manager 3230 may also provide aggregate packet statistic streams to a requesting client application. The protocol manager 3230 synchronizes the packet arrival from different sensors into a common time line. That is, packets captured at the same time in two different sensors may reach the server at a certain time skew. The protocol manager 3230 ensures that this time skew does not affect the packet traces. The protocol manager 3230 also detects when multiple sensors may see the same packet and report it to the server and remove the duplicate packet.

A set of filters may be used to configure background and real-time filtering of packets (as well as configuring the size of the background log) and are executed by the protocol manager 3230.

Figure 6:
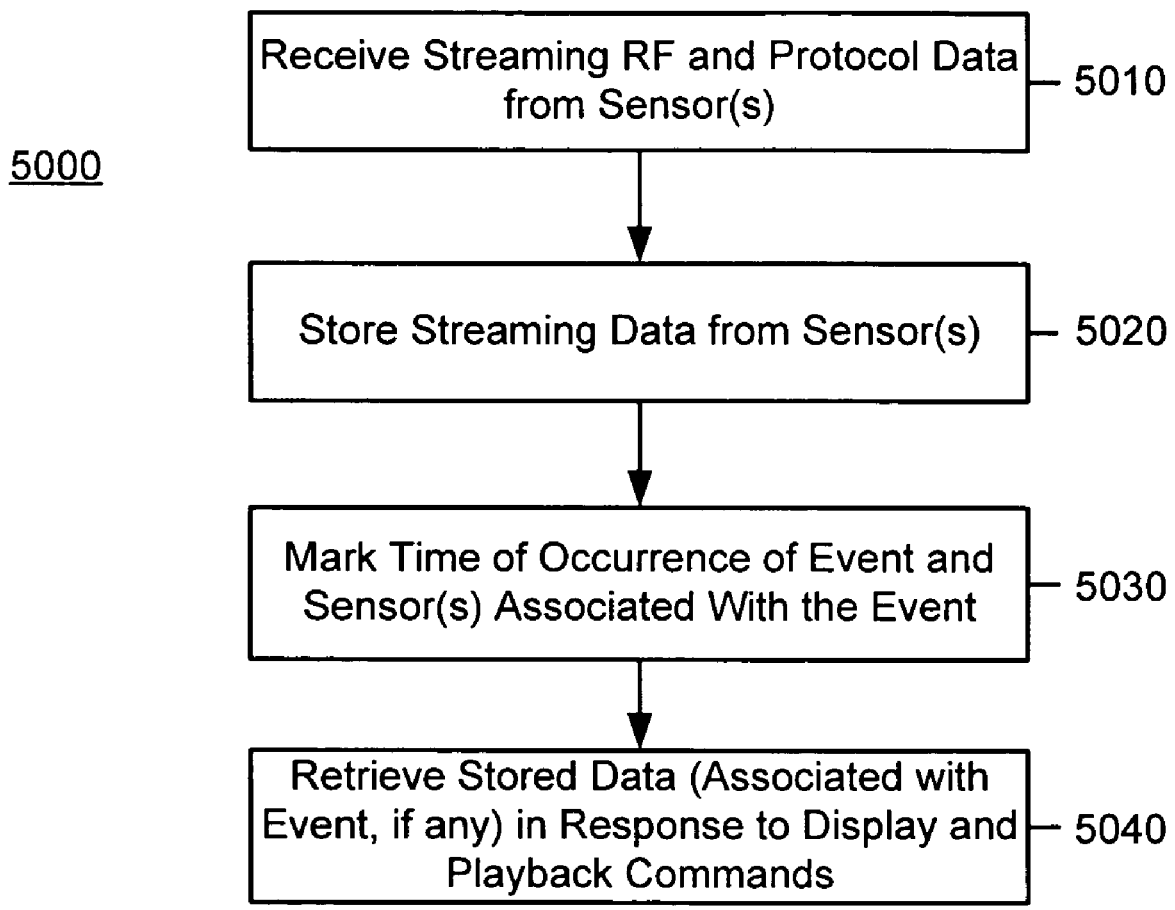
FIG. 6 is a flow chart that generally illustrates a process whereby data collected from sensors may be displayed.

FIG. 6 illustrates a process 5000 for a real-time streaming display of data from sensors and a time-shift playback mode. The time-shift playback mode allows an administrator to look back at historical spectrum and/or protocol analysis data, in order to investigate problems, without the administrator being present (in time or place) with respect to the activity. For example, an administrator can arrive at the office on Monday, see a problem report, TCA alert or event from Friday night, and pull up spectrum plots and/or protocol statistics from around that time.

In step 5010, the server receives a continual background data stream from each sensor of spectrum and protocol analysis data to be stored in persistent storage. The data will have a configurable refresh rate (e.g., once per second). In step 5020, the server continuously stores the streaming data from the sensors, and display of the data in real-time may be made available to a console application in step 5040.

If and when an event occurs, such as an interference event, TCA event, etc., in step 5030 the server stores/marks the time of occurrence of the event and the sensor(s) associated with the event. Later, as shown by step 5040, upon a user command from a console or other GUI application, the stored streaming data associated in time with the event may be played back (as if occurring in real-time) for display. An example of a TCA event is an air quality statistic crossing a threshold.

Examples of the background streaming spectrum analysis data that may be displayed in real-time (live) and in a time-shift mode are:

Power vs. Frequency data for the frequency band, such as average power, duty cycle and maximum power.

Pulse histograms for one or more of center frequency, bandwidth, duration, time between pulses (gap), power and number of pulses.

The air quality statistics described above may also displayed in real-time (live) and in a time-shift mode. Sensors will send a continual background air quality statistic stream to the server to be stored in the database in much the same way as the spectrum analysis data. The air quality data may have a configurable refresh rate (e.g., from 20 seconds to 5 minutes, nominal once per minute).

FIG. 7 shows an event log screen that lists events that have occurred in an environment. A user interface may be provided such that when a user right clicks on a particular event, it allows the user to open a window, called an Air Data window, to view time shifted spectrum analysis data and recorded Air Quality statistics around the time of the event. The event log provides a real-time monitor for all significant RF events which occur in the vicinity of the WLAN. The precise choice of "significant" events is user-configurable, but it can include 802.11 devices joining or leaving the network, detection of 802.11 devices which are not part of a particular WLAN, detection of interferers, triggering of TCAs, events within the system itself (such as detection of problems with a sensor).

The event log has display columns, containing the following information, as an example:

Alert Level—Indicates the severity of the information, which ranges from Info, to Low, to Severe, for example.

Classification—Events are classified by functional groupings, which include the following:

System health/behavior (SHB): Reflects events which relate to the state of the system itself (such as a sensor coming up or going down).

Interferer classification (IFC)—Identification of a microwave oven, Bluetooth device, cordless headphone or headset, or other interferer.

802.11 Discovery (DISC)—Identification of a WLAN device (which may or may not be part of a network).

Threshold crossing alarm—The log displays alarms when a TCA is triggered on or off.

Type—Identifies the specific nature of the event, such as an 802.11 device being added to the network (or being dropped from the network), and interferer appearing or no longer being active, etc.

Message—Provides more specific information, such as a MAC address for a new 802.11 device, or a channel being impacted by RF activity. More information about an event can be obtained by selecting the event, which opens other windows described hereinafter.

Date and Time—The date and time of the event in local time, expressed as the date followed by a time with minutes and seconds.

Figure 8:
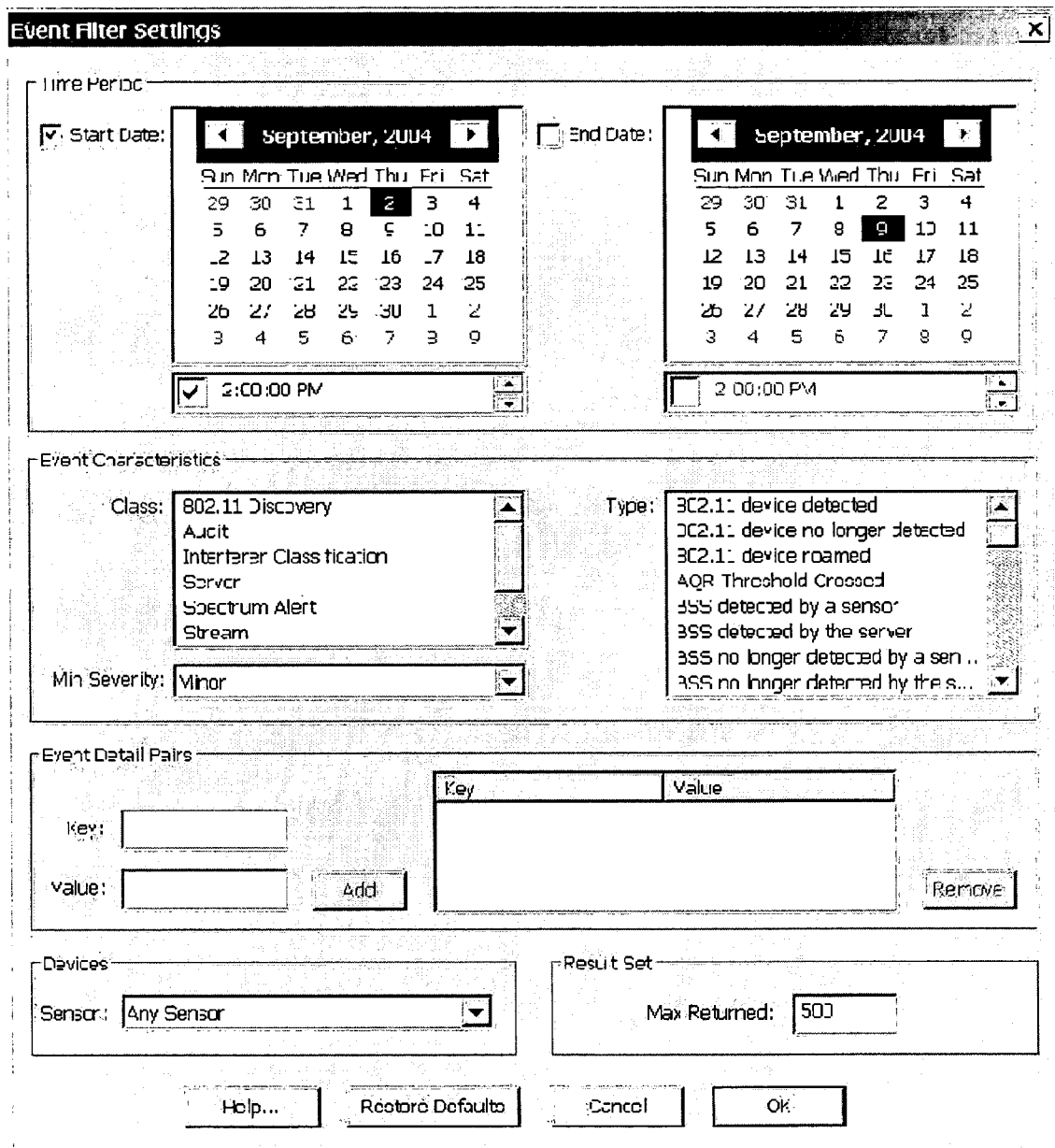
FIG. 8 is an exemplary display of an event filter window that allows a user to configure events to be displayed in the event log window.

FIG. 8 illustrates the event filter setting window. The event log filter enables a user to determine the types of information shown in the event log. The event filter settings dialog presents numerous controls that determine which events will be displayed by the event log:

Time Period: Filter events to a particular range of dates of interest. The Start Date and End Date are enabled individually by turning on the check box adjacent to the calendar controls. By default, the filter has the End Date filtering disabled (so current events are retrieved), and has a start date of the current date minus one week.

Class: Enables a user to specify the class of events to be displayed (e.g., Health, Interferer, etc.). The available classes are presented in a scrolling window that contains one check box for each element of interest.

Types: Enables specification of the type(s) of events to be presented (such as sensor up/down, interferer up/down, etc.).

Severity: Every event in the system may have an associated severity, ranging from Low to Severe, as an example. A user may select the lowest level of severity to be displayed in the event log. All events with that level of severity, or higher severity, will be displayed.

Event Detail Pairs: Track events that have a particular property/value assignment. These pairs of entries are free-form text, consisting of an XML attribute name (the Detail Key) pained with a specific value for that attribute (the Detail Value).

Examples include:

Detail Key=Sensor, Detail Value=3

Detail Key=interferer_type, Detail Key=Bluetooth.

Maximum Results: This field allows for limiting the number of events retrieved for browsing, even when other filter parameters have failed to narrow the field. This may be of particular use for printing via export to HTML or CSV export, to limit the resulting output size when desired.

Sensor: This list box presents a list of sensors that are known to the system, along with all defined sensor groups. Both currently enabled and currently disabled sensors are included in the list. A single sensor may be selected, so that the event log will only display events reported from that one sensor; or a group of sensors may be selected so that the log will display events from all sensors in the group.

Figure 9:
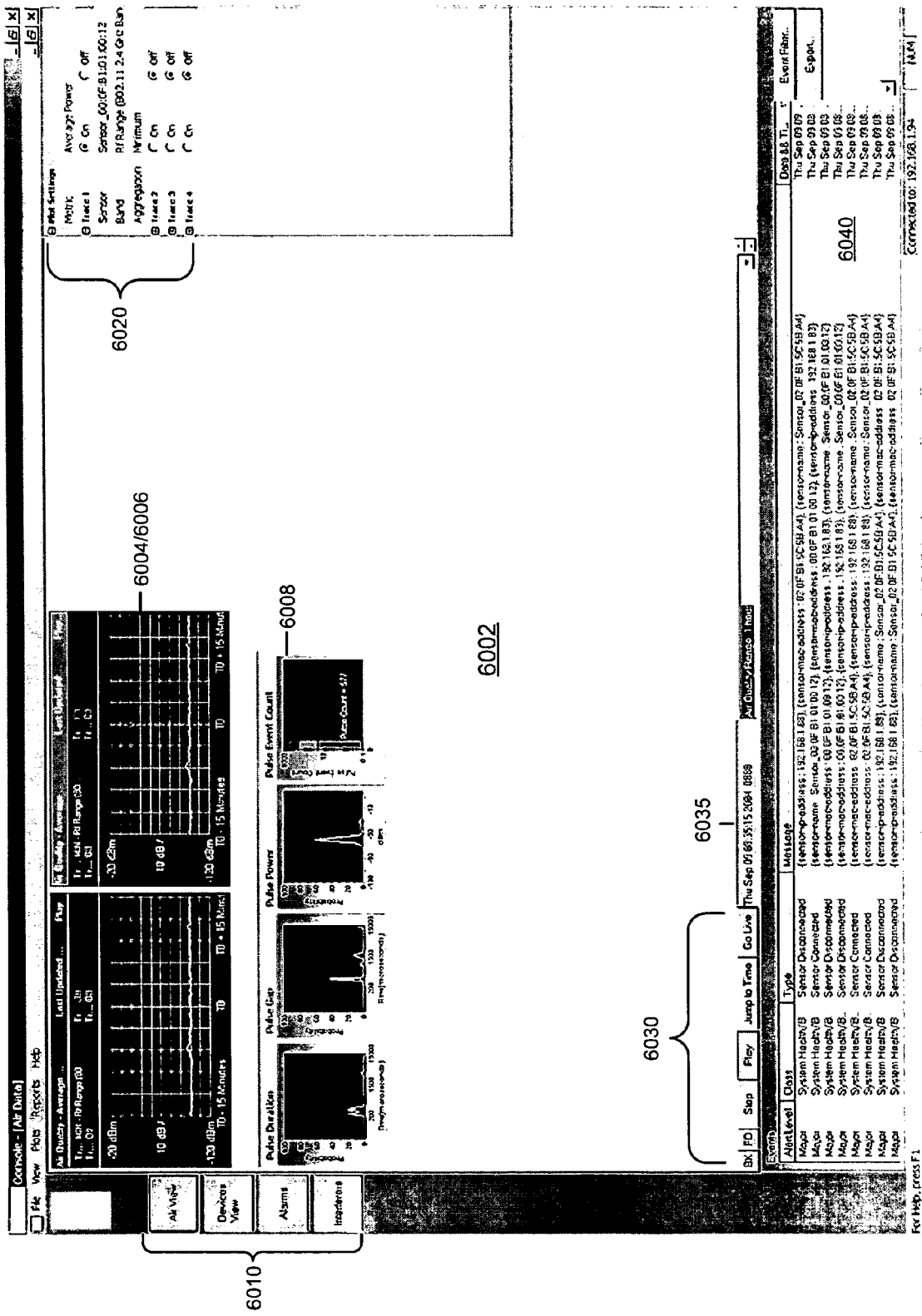
FIG. 9 is an exemplary display of a main console window, and shows display of plots of data obtained and/or derived by the server from data produced by one or more sensors.

FIG. 9 illustrates a design for a window 6000 of a console application that has controls for accessing data from the sensors. Along the left side of window there are view control buttons 6010 that select one of several functions that may be displayed in the data window space 6002. The function shown in FIG. 8 is the "Air View" in which plots for traces of Air Quality metrics from one or more sensors are displayed at reference numerals 6004 and 6006. With respect to the spectrum analysis data, multiple plot windows may be displayed simultaneously per console. For each plot window, a user can select the source sensor plot type, and trace types, along with the color coding of each trace.

Settings for display of the Air Quality metric traces are made by the controls shown at reference numeral 6020. For example, a user can select one of the several Air Quality metrics, such as average power. A user can select which sensor is the source of the metrics, which frequency band or frequency range the metric is to be derived for, and the degree of aggregation. The server collects data from all sensors, all 802.11 channels, and collects the data continuously over time. The server software maintains records of cumulative data, such as RF activity across all (or specified) channels, or interferers detected by all (or specified) sensors across the enterprise. Additional plots (up to 4 as an example) of any of the aforementioned statistics, Air Quality metrics, etc., may be displayed in the data window space 6002 from any sensor. For example, there are plots shown at reference numeral 6008 for a variety of pulse histograms.

Other metrics or data that may be selected from any sensor for display include:
Examples of the plots are:
Power vs. Frequency: horizontal is frequency, vertical is power.
Pulse Histograms: horizontal is frequency or time, vertical is percentage or value.
Power vs. Time: horizontal is time, vertical is power.

The air quality plots display air quality as a function of time. Air quality is determined by combining values for one or more spectrum and/or protocol measurements. For example, an air quality measurement based only on spectrum properties might be based strictly on the average RF power, or it might be based on RF power plus the number of pulses per second. The higher the values—the more RF power, and the more pulses per second—the lower the overall RF air quality. An air quality measurement based on 802.11 protocol parameters might include average data rate selection, and percentage of frame retries. In this case, higher data rates are good, but higher frame retries indicates performance problems, so the server creates an aggregate measurement reflecting the overall quality.

Real-time and historical plots of air quality data may be displayed in several simultaneous plot windows. For each plot window, a user can select the air quality statistic (those described above) to be plotted. Each plot window may support a number of traces. For each trace, the user may select and configure which sensor the air quality data is to be sourced from, the frequency range, a set of 802.11 BSSIDs if appropriate, and the color of the trace. In addition to selecting a single sensor and frequency range, a user may be able to select aggregated statistics (average, max, min) across frequency ranges for a given sensor, or across sensors, or both.
Examples are:
Maximum duty cycle for all frequency ranges on sensor 2.
Minimum pulses per second on frequency range 6 for all sensors.
Average pulse duration for all frequency ranges and all sensors.

For plots that may be displayed in the data window space 6002, there are controls to select how those plots are displayed.

Change Time Scale. Allows the time-scale to be adjusted for plots which have time as their "X" axis. In other words, this control allows zooming in/out in time.

Display Time Range. This area 6035 displays the current time-range that is being viewed by the Air Data window.

Controls shown at reference numeral 6030 are playback controls.

Browse Forward/Back (FD and BK). This control works as a page fast forward/reverse within historical time.

Jump to Time. This control allows random-access to points in time. The Jump-to-Time control may support the ability to jump to an explicitly entered time-value, Go Live or Navigate by Event. Navigation by event involves jumping to the time associated with a particular event of interest. When the Jump to Time button is selected, a display of a calendar is brought up allowing a user to select a particular day as well as time of day to begin playback of plots and related data. After the requested jump to a particular time, the Air View will be in a "stopped" state, plot controls will display data for the "current time position" (that is, the selected time, called T0). Hitting the Play button begins time-shifted data playback from that selected point in time. The selected instant in time is indicated by T0, and data is scrolled from the right to left to cover a user selectable time range of interest. For example, if a 30 minute time range is selected, data in the future by T0+15 minutes is scrolled from right to the left across T0 to data in the past at T0−15 minutes. In general, retrieved data is scrolled from the (future) right (T0+Range/2) to the (past) left (T0—Range/2).

The Play button allows for resuming display of data from a given point in time.

The Stop button stops display of additional data, essentially freezing the plots.

Additional controls on the Air Data Window provide for additional monitoring and research features.

Change Channel. This control allows reconfiguration of all plots in the Air Data window to view a channel of interest. This feature allows for rapid ad hoc investigation with the Air Data window.

Change Sensor. This control allows reconfiguration of all plots in the Air Data window to view a sensor of interest.

Create Report. This control allows a report is to be generated. Many attributes of the report may be selected by a dialog displayed when this control is operated, but, by default, the report will use the time range currently in effect for the Air Data window.

Pulse histogram plots are driven by the SAGE pulse detectors. These are shown at reference numeral 6008 in FIG. 9. The types of Pulse Histogram plots include center frequency, bandwidth, duration, time between pulses (pulse gap), power and number of pulses. Any combination of these sub-plots may be shown simultaneously in a single plot window. The user can select which of the sub-plots is active.

The pulse histogram plots are driven off SAgE pulse detector data. The plots summarize attributes of pulses into visual bar chart distributions. For each axis, there is a configuration for the range of values (start, stop) displayed, and the number of grid lines (if any). There are several subplot types any combination of which may be displayed, but all from the same sensor: Center Frequency—The X axis is Frequency (kHz, MHz, or GHz), Bandwidth—The X axis is Frequency (kHz, or MHz), Duration—The X axis is Time (µs or ms), Inter pulse Gap (Start time to start time)—The X axis is Time (Ps or ms), Power—The X axis is Power (dBm), and Count—The X axis only covers a single bar, and has no unit of measurement.

Still referring to FIG. 9, there is an events log 6040 displaying events, described above and further hereinafter, similar to the event log view in FIG. 7. Events are stored by the server over time. Events for a particular day and time may be retrieved and viewed in much the same manner as the Air Quality and related plots.

Figure 10:
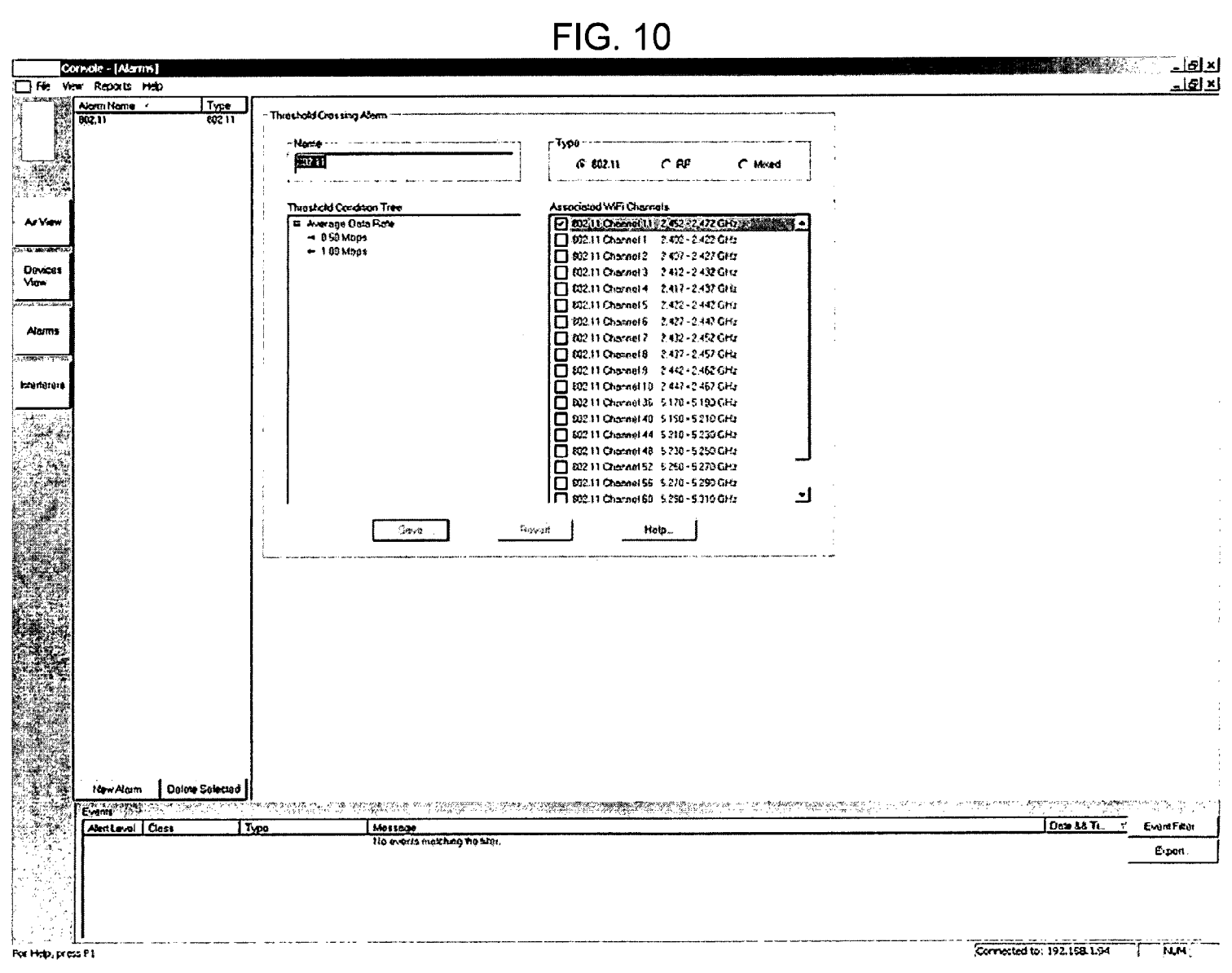

FIG. 10 illustrates the Alarms window. Through this window of the console, a user may select certain alarms. An alarm is an alert or warning issued when certain RF/spectrum trigger criteria, or certain 802.11 trigger criteria, indicate that the quality of the RF environment has decreased below a designated level. The precise nature of an alarm, that is, the precise trigger criteria, is user-definable. The alarm, when triggered on or off, will show up in the event log (FIG. 7), assuming the event log filter has been set to allow for the display of alarms. Alarms are also recorded in the server database for reporting purpose.

For example, a single alarm might be of the form:
If (Pulses Per Second >10,000) and (Number of Stations >50) then Alarm is Triggered
When (Pulses Per Second <=8,000) or (Number of Stations <40) then Alarm, if previously Triggered, is now Off There are several types of alarms that may be set: alarms related to protocol or 802.11 traffic, alarms related to RF activity (interferers, other spectral related alarms) and mixed alarms.

For a single alarm criteria, an Upper Threshold or a Lower Threshold may be set.
  Upper Threshold: The alarm is triggered when the measured value (such as RF power or Number Of Stations in use) rises too high. Example: Packet Retries >50%
  Lower Threshold: The alarm is triggered when the measured value (such as Data Rate) falls too low. Example: Average Data Rate <10 Mb/s An alarm may consist of multiple trigger criteria. For example, an alarm to be triggered when the average RF Power exceeds a certain amount, and when the maximum RF Power exceeds a certain amount. In this case, the alarm is triggered only when both criteria are met. As another example, an alarm may be triggered when the average Data Rate falls below a certain value, or when the number of 802.11 Packet Retries per second exceeds a certain value. In this case, the alarm is triggered when either (or both) of the trigger criteria are met. Trigger criteria can be connected by the logical relations of AND, OR, and NOT.

A given threshold (Upper Threshold or Lower Threshold) has both an Enter Value and an Exit Value.
  Enter Value—The value which actually triggers the alarm to an "on" condition. For a composite alarm, the Enter value determines when one particular threshold criteria is valid, or active. (Whether or not the alarm as a whole is triggered is determined by the other thresholds in the Alarm as well, and of course by events in the RF environment.)
  Exit Value—The value which turns the trigger off. For a composite alarm, the Exit value determines when one particular threshold is no longer valid, or no longer active. (Whether or not the alarm as a whole is turned off is determined by the other thresholds in the Alarm as well, and of course by events in the RF environment.) Separate Enter and Exit values prevent an alarm from being in a state of oscillation.

The Enter and Exit values should be close enough that they both reflect a major change in an RF environment (such as too many packet retransmissions). But the two values should also be far enough apart that, once the Alarm is triggered ON, it requires a distinct change in the RF environment for the Alarm to go OFF again.

There may be several alarm types, selectable by a user from the Alarm Type dialog. These include: 802.11 (network), RF and Mixed. There are many TCAs that can be selected for a particular alarm, as well as the thresholds from a Threshold Condition Tree list and a Threshold Settings dialog to set Upper or Lower Threshold, Enter value and Exit value. The Associated Channels/RF Ranges box allows a user select which channels or RF ranges should be monitored for the threshold criteria. Additional criteria for a particular alarm may be added by selecting that alarm and specifying the additional criteria in a similar manner.

Figure 11:
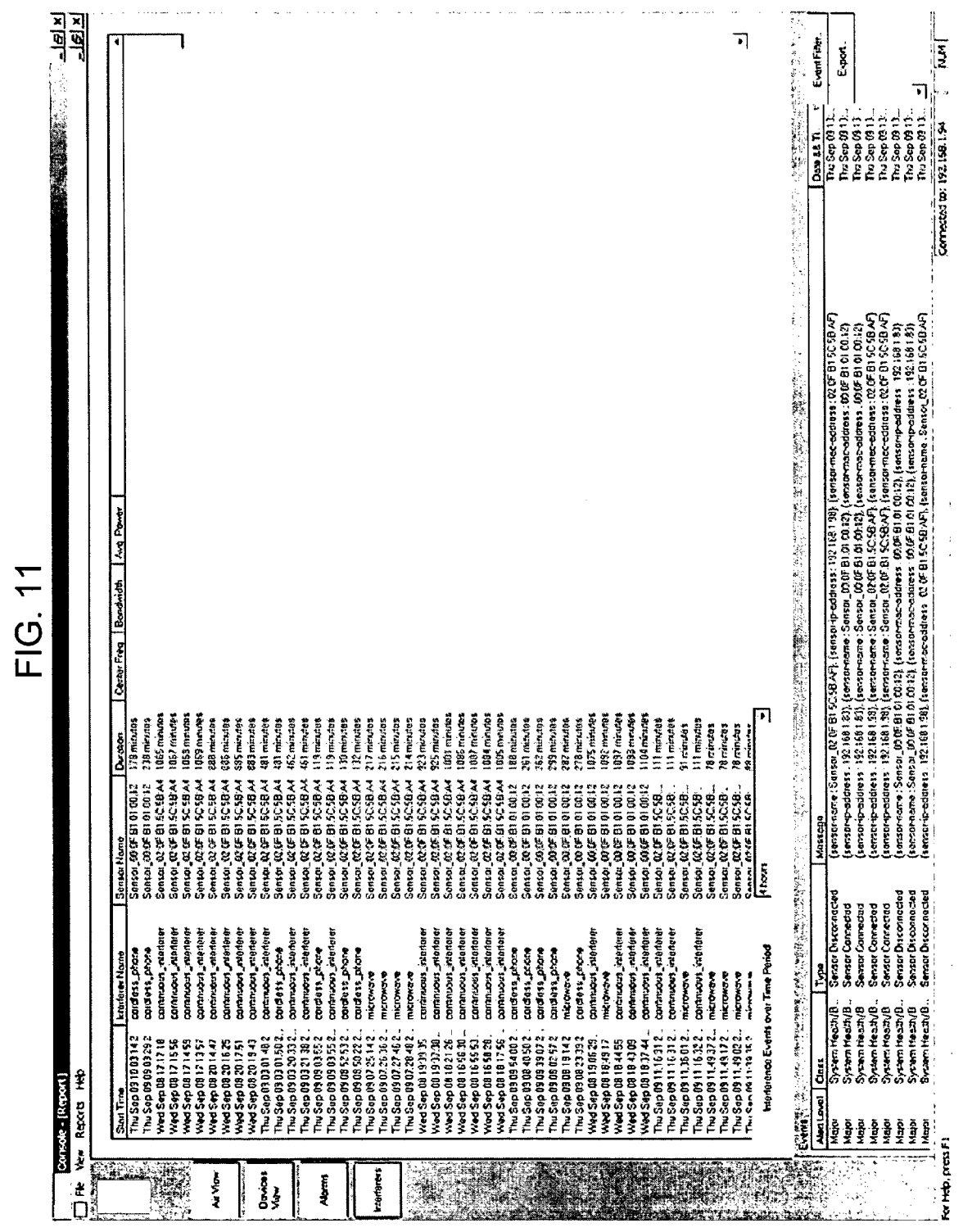

FIG. 11 illustrates the Interferers window that displays all interferers that are active, in the neighborhood of a particular WLAN, during a specified time frame. An interferer is any non-802.11 RF device which broadcasts in the same frequency bands as 802.11 devices, and which can cause disruption to an 802.11 network, for example. Typical interferers include microwave ovens, cordless headphones and headsets, radar, and Bluetooth devices.

The Interference Event Over Time Period drop-down list box allows a user to specify a time-interval of interest. For example, if a period of ten minutes is selected, the user will see a display of all interferers which have been active during the preceding ten minutes. The display is updated once every minute.

The following information may be displayed about each interfering device:
  Start Time—The time that the Interferer became active.
  Interferer Name—The type of interference device (for example, Microwave Oven, or Bluetooth).
  Sensor Name—The sensor which detected the device.
  Duration—The amount of time that the interference source has been active (or was active, if it has ceased to transmit).
  Center Frequency—The center frequency of the radiation emitted by the device.
  Bandwidth—The bandwidth of the energy emitted by the device.
  Average Power—The average power emitted by the device.

The ability to retrieve and display data in the time-shift mode shown in FIG. 9 (with Jump to Time, Play, Fast Forward, Reverse, Stop, etc., controls) may also be applied to the Event Log shown in FIGS. 7 and 9, Alarm view shown in FIG. 10 and Interference view shown in FIG. 11.

Figure 12:
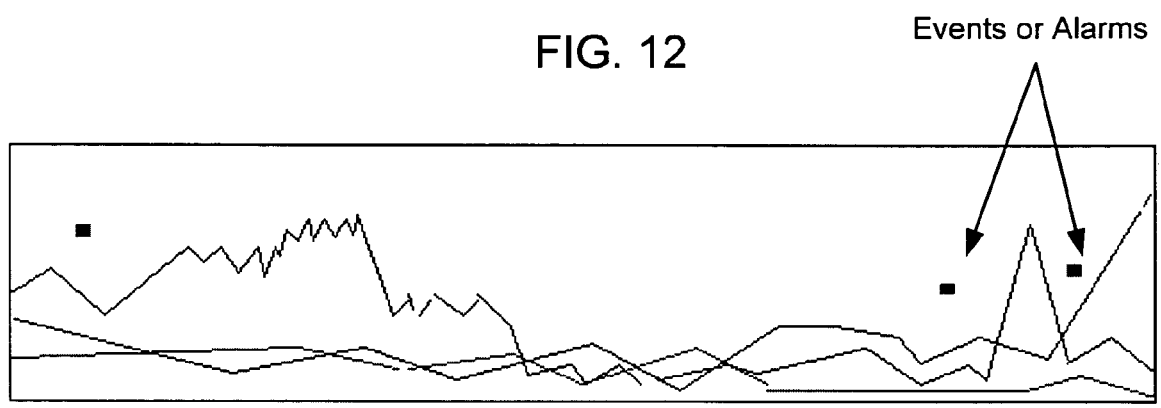
FIGS. 12 and 13 are diagrams showing how a plot with multiple traces may be displayed and how events are marked on a trace, from which a user may proceed to more comprehensive spectrum analysis data associated in time with the event.
Figure 13:
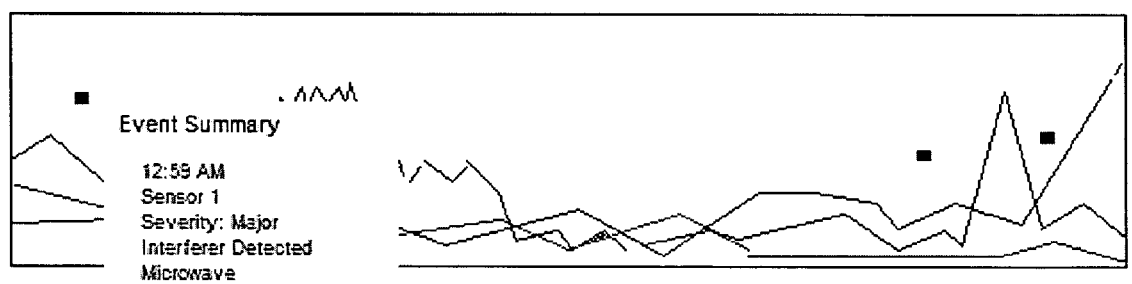

Reference is now made to FIGS. 12 and 13. In addition to the controls for navigating time illustrated at the bottom of the window, a plot such an air quality plot, may support navigation in time by clicking any point within the plot. When this occurs, the "current time" is determined by determining the position of the click relative to the plot's x-axis, and the entire air data window is set to the corresponding time. In addition to plotting regular "air quality" statistics, its may also show events. This offers the potential for temporal correlation of events with other data (spectrum, protocol and/or air quality). Placing the mouse cursor over an event produces a tool-tip style summary of information about the event. Right-clicking produces a pop-up menu with the option to display a full property-sheet for the event.

The user interface and display functionality described in the foregoing and shown in the accompanied figures may be executed by the server and viewed on a monitor device connected thereto, or a remote computer device such as the remote network management station shown in FIG. 1.

The system described above is useful for many operating scenarios. An information technology (IT) administrator may use the system to help perform day-to-day management of his/her wireless systems. The IT administrator can use the system in two in a "firefighting" mode and a "planning" mode.

In the firefighting mode, examples of tasks are to identify (and alert on) problems in the RF environment and diagnose the problem as quickly as possible. The IT administrator would configure threshold crossing alarm alerts to provide pop-ups, emails, traps, etc., in response to alarm conditions. Also, an event log and air quality plots would be provided.

Typically, the system will be operating in the background. In some cases, the IT administrator may have the console up and running, with a set of air quality plots showing the overall state of the system at all times, so that he/she may glance at them periodically.

In other cases, the IT administrator may not have the console up and running at all, or, it may be iconified. When a problem occurs (e.g., significant threshold event, new interferer detected, etc.), the system will alert the IT administrator immediately. The alert may be a pop-up bubble on his console, an SNMP trap to a higher level management system, or an email (which can be connected to a pager system).

The IT administrator has the ability to configure threshold levels and event types that generate alerts. The key concept is that he be able to optimize the configuration over time to be notified only when something is actually wrong (i.e., eliminate false alarms) and before the problem has progressed too far that there is serious service degradation in the network.

Once the problem occurs, the IT administrator goes into action to determine the cause of the problem. If the console is not already open, at this point he/she opens the console. Through a combination of the event log and the air data window, the administrator can quickly ascertain the nature and cause of the problem. If the solution to the problem is not obvious (e.g., remove the interfering device), he may turn to a person who is an RF expert to help him arrive at a solution using the system.

In planning mode, the administrator uses the system to analyze data to expose latent issues and to analyze trends for issues over time. In this mode, the administrator may use reports and air quality plots. The administrator can run reports that include performance statistics useful to spot latent problems. For example, it may be the case that performance is slowing down 50% due to interference from a microwave oven at lunch time, but the problem has not been reported because it is difficult to detect at the user level. The administrator can also run reports that look at trends of statistics over time. For example, the number of retries on 802.11 channel 1 may be 20% one month, but was 10% the prior month, and 5% in the month prior. This trend information points to a problem that may be getting worse over time, and that will become serious in a month or two.

An RF expert uses the system as a remote 24×7 spectrum analysis tool. This person is most likely available for installations where the wireless system is considered mission critical. An RF expert has a detailed RF understanding and is familiar with traditional spectrum analyzers. In addition, this person may have a detailed understanding of wireless network systems. The RF expert may investigate reported events at the raw RF level. He/she may review raw RF data for cases that are not identified/classified by the system and confirm that recommended solutions have alleviated the problem. The RF Expert may use the detailed spectrum analyzer capabilities to confirm and/or supplement the intelligence capabilities built into the system. For example, if the system reports that a video interference signal is occurring, he/she may wish to view the power vs. frequency plots to confirm that it is not some other type of device. In addition, in cases the system does not recognize the interference the RF expert may examine the spectrum analysis data to make an assessment. The time shift mode is useful in cases where the problem is intermittent, or was a single event that occurred in the past (e.g., over a weekend) so that the RF Expert can see the spectrum plots that occurred at the time of interest.

Another use of the spectrum analyzer capabilities is to confirm when a problem has been fixed by corrective action. When a fix has been attempted, the IT department cannot afford to wait until the next day to see that no problem alerts re-surface. The RF expert can use the spectrum analyzer functions to perform before and after comparisons that confirm a fix (ex. Shielding added to an interference device) has indeed fixed the problem.

A network operations center (NOC) operator uses the system to perform monitoring and diagnosis of RF wireless systems at remote sites. Examples include WLAN hotspot service providers, or RF contract houses. Unlike the IT administrator case, the NOC typically employs people whose sole job is to monitor the system full time. In this case the air quality plots may be up and running 24×7, and are constantly being viewed to spot problems and trends. When an operator notices a problem or concern, he/she drills down into different views of the data to see more about the problem.

To summarize, a method is provided for presenting data related to activity occurring in a frequency band, comprising steps of continuously storing data derived from energy received in a frequency band over time; and presenting the data to a user. In addition, a method is provided for presenting data related to activity occurring in a frequency band, comprising steps of: receiving energy in the frequency band at each of a plurality of radio devices; generating spectrum analysis data from the received energy at each of the plurality of devices; generating protocol analysis data pertaining to analysis of packets sent according to a communication protocol in the frequency band; continuously storing the spectrum analysis data and protocol analysis data produced by each of the plurality of radio devices; and presenting the spectrum analysis data and protocol analysis data to a user. Similarly, a system is provided for monitoring activity in a frequency band, comprising: at least one radio device positioned at a location in a region where activity in the radio frequency band is occurring, the radio device monitoring packets transmitted on a wireless network in the frequency band to produce packet analysis data representing analysis of the packets, and monitoring radio frequency energy occurring in the frequency band to produce spectrum analysis data representing analysis of at least a portion of the frequency band; and a computing device coupled to the at least one radio device that receives data from the radio device and executes functions to process the data supplied by the radio device, wherein the computing device continuously stores the packet analysis data from the radio device and presents the data to a user.

Likewise, the presentation functionality may be embodied by a computer readable medium storing instructions that, when executed by a computer (either the server or a remote computing device), cause the computer to perform the step of continuously displaying spectrum analysis data derived from performing spectrum analysis on energy received in a frequency band and protocol analysis data pertaining to analysis of packets sent according to a communication protocol in the frequency band. There may be instructions stored on the medium that cause the computer to retrieve the spectrum analysis data and/or protocol analysis data from storage for an interval of time beginning prior to the current time, and to display user interface controls to control the playback of the spectrum analysis and/or protocol analysis data with one or more controls including: play, pause, reverse and forward.

Moreover, a method is provided for presenting data related to activity occurring in a frequency band, comprising steps of: receiving from a plurality of radio devices spectrum analysis data derived from energy received in the frequency band at each of a plurality of radio devices; receiving from the plurality of radio devices protocol analysis data pertaining to analysis of packets sent according to a communication protocol in the frequency band that are received at each of the plurality of radio devices; continuously storing the spectrum analysis data and protocol analysis data received from the plurality of radio devices; retrieving spectrum analysis data and/or protocol analysis data from storage for an interval of time beginning prior to a current time; and displaying plots and/or statistics associated with the spectrum analysis and/or protocol analysis data for the interval of time in a scrolling format.

The above description is intended by way of example only.

What is claimed is:

1. A method for presenting data related to wireless activity occurring in a frequency band, comprising:
   a. continuously storing data derived from energy received in a frequency band over time, said data comprising spectrum analysis data derived from performing spectrum analysis on energy received in the frequency band and protocol analysis data pertaining to analysis of packets sent according to a wireless communication protocol in the frequency band;
   b. monitoring the spectrum analysis data and/or protocol analysis data to determine whether a condition is satisfied corresponding to an event associated with wireless activity in the frequency band represented by the spectrum analysis data and/or protocol analysis data, wherein each event has associated therewith information comprising: severity level of the event with respect to its impact to a wireless network operating in the frequency band, functional classification of the event, type of the event including whether a wireless device has been detected or is no longer active, and date and time of the event;
   c. receiving from a user event filter information that determines which events detected based on said monitoring that are to be presented to the user, the event filter information comprising an indication of one or more of: severity level, functional classification, type and time period of occurrence, of an event to be presented to the user;
   d. receiving from the user alarm trigger information for issuing an alert presented to the user when the spectrum analysis data and/or protocol analysis data matches alarm trigger criteria defined by the alarm trigger information, wherein receiving the alarm trigger information comprises receiving data indicating an upper threshold or a lower threshold for each user-configurable alarm, wherein an upper threshold causes an alarm to be triggered when a value derived from the spectrum analysis data and/or protocol analysis data exceeds a threshold value and a lower threshold causes an alarm to be triggered when a value derived from the spectrum analysis data and/or protocol analysis data falls below a threshold, and receiving for an upper threshold or a lower threshold an enter value and an exist value, wherein the enter value is a value that if satisfied triggers the alarm to an "on" condition and the exit value is a value that if satisfied triggers the alarm to an "off" condition, and wherein the exit value and the enter value are different: and
   e. comparing events detected based on said monitoring with said event filter information received from the user and presenting to the user an alert for an event that matches the event filter information.

2. The method of claim 1, wherein the step of presenting comprises displaying the spectrum analysis information as it occurred over time on or about the time of occurrence of the event.

3. The method of claim 1, and further comprising detecting occurrence of one or more types of signals occurring in the frequency band that interfere with operation of a wireless network operating in the frequency band.

4. The method of claim 3, wherein presenting data comprises displaying information indicating the type of signal detected and time of detection.

5. The method of claim 1, and further comprising receiving energy in a frequency band at each of a plurality of radio devices, and generating the data from the received energy at each of the plurality of radio devices.

6. The method of claim 5, wherein receiving energy comprises receiving energy in a building where wireless network activity is occurring in the frequency band together with other activity.

7. The method of claim 5, and further comprising aggregating statistics derived from the data from two or more radio devices, and wherein presenting comprises displaying data aggregated from two or more radio devices.

8. The method of claim 7, wherein aggregating comprises combining statistics derived from spectrum data pertaining to spectrum analysis performed by the two or more radio devices based on energy they receive in the frequency band and/or from protocol analysis data pertaining to analysis of packets sent according to a communication protocol in the frequency band and received by the two or more radio devices.

9. The method of claim 1, wherein presenting comprises retrieving the data from storage beginning at an instant of time prior to the current time.

10. The method of claim 9, and further comprising controlling playback of the data with one or more controls including: play, pause, reverse and forward.

11. The method of claim 1, wherein presenting comprises displaying data including plots of power versus frequency data derived from the energy received in the frequency band over time.

12. The method of claim 11, and further comprising controlling the playback of the data with one or more controls including: play, pause, reverse and forward.

13. The method of claim 1, wherein the step of presenting comprises displaying plots for statistics associated with pulses of energy detected in the frequency band over time including one or more of center frequency, bandwidth, time duration, time between pulses, power and number of pulses.

14. The method of claim 13, and further comprising controlling the playback of the information with one or more controls including: play, pause, reverse and forward.

15. The method of claim 1, wherein the step of presenting comprises displaying plots over time for one or more of: average power, duty cycle and maximum power in a particular frequency range within the frequency band.

16. The method of claim 15, and further comprising controlling the playback of the information with one or more controls including: play, pause, reverse and forward.

17. The method of claim 1, wherein presenting comprises displaying plots of statistics, with respect to activity in a particular frequency range within the frequency band, for one or more of: pulses of radio frequency energy per time interval, duration of pulses of radio frequency energy, percentage of packet resends associated with a communication protocol, average data rate associated with a communication protocol traffic in the frequency band and number of detected client stations that operate according to the communication protocol.

18. The method of claim 17, and further comprising controlling the playback of the information with one or more controls including: start, play, pause, reverse and forward.

19. A method for presenting data related to wireless activity occurring in a frequency band, comprising:
   a. receiving wireless energy in the frequency band at each of a plurality of devices;
   b. generating spectrum analysis data from the received energy at each of the plurality of devices;
   c. generating protocol analysis data pertaining to analysis of packets sent according to a wireless communication protocol in the frequency band at each of the plurality of devices;
   d. continuously storing the spectrum analysis data and protocol analysis data produced by each of the plurality of radio devices;
   e. monitoring the spectrum analysis data and/or protocol analysis data to determine whether a condition is satisfied corresponding to an event associated with wireless activity in the frequency band represented by the spectrum analysis data and/or protocol analysis data, wherein each event has associated therewith information comprising: severity level of the event with respect to its impact to a wireless network operating in the frequency band, functional classification of the event, type of the event including whether a wireless device has been detected or is no longer active, and date and time of the event;
   f. receiving from a user event filter information that determines events detected based on said monitoring that are to be presented to the user, the event filter information comprising an indication of one or more of: severity level, functional classification, type and time period of occurrence, of an event to be presented to the user;
   g. receiving from the user alarm trigger information for issuing an alert presented to the user when the spectrum analysis data and/or protocol analysis data matches alarm trigger criteria defined by the alarm trigger information, wherein receiving the alarm trigger information comprises receiving data indicating an upper threshold or a lower threshold for each user-configurable alarm, wherein an upper threshold causes an alarm to be triggered when a value derived from the spectrum analysis data and/or protocol analysis data exceeds a threshold value and a lower threshold causes an alarm to be triggered when a value derived from the spectrum analysis data and/or protocol analysis data falls below a threshold, and receiving for an upper threshold or a lower threshold an enter value and an exist value, wherein the enter value is a value that if satisfied triggers the alarm to an "on" condition and the exit value is a value that if satisfied triggers the alarm to an "off" condition, and wherein the exit value and the enter value are different; and
   h. comparing events detected based on said monitoring with said event filter information received from the user and presenting to the user an alert for an event that matches the event filter information.

20. The method of claim 19, and further comprising aggregating data from two or more radio devices, wherein presenting comprises displaying data aggregated from two or more radio devices.

21. The method of claim 19, and further comprising retrieving the spectrum analysis data and/or protocol analysis data beginning at an instant of time prior to the current time.

22. The method of claim 21, and further comprising presenting the spectrum analysis and/or protocol analysis data with one or more controls including: play, pause, reverse and forward.

23. The method of claim 22, wherein presenting comprises displaying plots over time for one or more of: average power, duty cycle and
   maximum power in a particular frequency range within the frequency band.

24. The method of claim 1, wherein receiving comprises receiving data for the enter value and exit value for an alarm selected such that they are close enough to each other so that they both reflect a major change in an radio frequency environment but far enough apart such that once the alarm is triggered "on", a distinct change in the radio frequency environment is required for the alarm to go "off".

25. The method of claim 3, and further comprising receiving from the user information that specifies a time interval of interest for displaying information for an event pertaining to detection of a signal that interferes with operation of the wireless network during the specified time interval.

26. The method of claim 1, wherein monitoring comprises monitoring the spectrum analysis data and/or protocol analysis data to determine occurrence of an event, wherein the functional classification of an event comprises one or more of: identification of a non-wireless network wireless device that produces a signal that interferes with a wireless network operating in the frequency band, identification of a device that operates on a wireless network operating in the frequency band, an alarm associated with a statistic derived from the spectrum analysis data and/or protocol analysis data that exceeds a user-configurable threshold.

27. The method of claim 19, wherein receiving comprises receiving data for the enter value and exit value for an alarm selected such that they are close enough to each other so that they both reflect a major change in an radio frequency environment but far enough apart such that once the alarm is triggered "on", a distinct change in the radio frequency environment is required for the alarm to go "off".

* * * * *